United States Patent
Baba et al.

(10) Patent No.: US 11,181,890 B2
(45) Date of Patent: Nov. 23, 2021

(54) CONTROL SYSTEM, INFORMATION PROCESSING DEVICE, AND ANOMALY FACTOR ESTIMATION PROGRAM

(71) Applicant: OMRON Corporation, Kyoto (JP)

(72) Inventors: Kojiro Baba, Kusatsu (JP); Yasushi Yamawaki, Los Angeles, CA (US); Shigenori Sawada, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,577

(22) PCT Filed: Nov. 21, 2018

(86) PCT No.: PCT/JP2018/042956
§ 371 (c)(1),
(2) Date: Mar. 1, 2020

(87) PCT Pub. No.: WO2019/111709
PCT Pub. Date: Jun. 13, 2019

(65) Prior Publication Data
US 2020/0201300 A1    Jun. 25, 2020

(30) Foreign Application Priority Data
Dec. 7, 2017 (JP) .............................. JP2017-235221

(51) Int. Cl.
*G05B 19/418*    (2006.01)
(52) U.S. Cl.
CPC .................. *G05B 19/41835* (2013.01); *G05B 2219/31001* (2013.01)

(58) Field of Classification Search
None
See application file for complete search history.

(56) References Cited

U.S. PATENT DOCUMENTS 6,877,105 B1   4/2005   Watanabe et al.
10,552,249 B1 *  2/2020   Johansson ........... G06F 11/0751
(Continued)

FOREIGN PATENT DOCUMENTS

JP   H05-061284 A   3/1993
JP   H08-137540 A   5/1996
(Continued)

OTHER PUBLICATIONS

An English translation of the International Search Report("ISR") of PCT/JP2018/042956 dated Feb. 26, 2019.
(Continued)

*Primary Examiner* — Mohammad Ali
*Assistant Examiner* — David Earl Ogg
(74) *Attorney, Agent, or Firm* — Metrolex IP Law Group, PLLC

(57) ABSTRACT

A control system which controls a control target includes a controller connected to one or more devices through a network, and an information processing apparatus connected to the controller. The controller includes an event log containing an event having occurred during a control operation, and network statistical information containing statistical information associated with data transmission on the network. The information processing apparatus includes a factor estimation unit that provides an interactive user interface in accordance with selection of an anomaly phenomenon registered in the event log.

14 Claims, 20 Drawing Sheets

(56) References Cited

U.S. PATENT DOCUMENTS

| | | | |
|---|---|---|---|
| 2005/0144505 A1* | 6/2005 | Takeuchi | H04L 41/0677 |
| | | | 714/4.12 |
| 2014/0082417 A1* | 3/2014 | Barton | G06F 11/079 |
| | | | 714/26 |
| 2016/0274964 A1 | 9/2016 | Tanaka et al. | |
| 2017/0061307 A1 | 3/2017 | Bates et al. | |
| 2017/0099179 A1 | 4/2017 | Iwamura et al. | |
| 2017/0250883 A1 | 8/2017 | Sawada et al. | |
| 2020/0218217 A1* | 7/2020 | Li | H04L 67/025 |

FOREIGN PATENT DOCUMENTS

| | | | | |
|---|---|---|---|---|
| JP | H08137540 A | * | 5/1996 | ......... H04L 43/0847 |
| JP | 2001-103062 A | | 4/2001 | |
| JP | 2003-058242 A | | 2/2003 | |
| JP | 2003-108222 A | | 4/2003 | |
| JP | 2006-005775 A | | 1/2006 | |
| JP | 2017-153050 A | | 8/2017 | |
| JP | 2017153050 A | * | 8/2017 | ......... H04L 43/0847 |
| WO | 2017/003780 A1 | | 1/2017 | |

OTHER PUBLICATIONS

The Written Opinion("WO") of PCT/JP2018/042956 dated Feb. 26, 2019.

The extended European search report (EESR) dated Jun. 25, 2021 in a counterpart European patent application.

* cited by examiner

FIG.5

| | | 34 |
|---|---|---|
| 340 | 341 | 342 | 343 |

| EVENT OCCURRENCE TIME | | OCCURRENCE SOURCE | CONTENT | EVENT CODE |
|---|---|---|---|---|
| 2017/5/1 | 13:10:01 | PLC | [CRITICAL] LINK-OFF ERROR | 00000015 |
| 2017/5/1 | 13:10:02 | COUPLER | [CRITICAL] COMMUNICATION SYNCHRONIZATION ERROR | 00000016 |
| 2017/5/1 | 13:10:02 | COUPLER | [CRITICAL] COMMUNICATION SYNCHRONIZATION ERROR | 00000016 |
| 2017/5/1 | 13:10:03 | FUNCTION UNIT | [CRITICAL] UNIT OUTPUT SYNCHRONIZATION ERROR | 00000015 |
| 2017/5/1 | 13:10:03 | FUNCTION UNIT | [CRITICAL] UNIT OUTPUT SYNCHRONIZATION ERROR | 00000015 |
| 2017/5/1 | 13:10:03 | FUNCTION UNIT | [CRITICAL] SLAVE COMMUNICATION ERROR | 00000021 |
| 2017/5/1 | 13:10:03 | FUNCTION UNIT | [CRITICAL] UNIT OUTPUT SYNCHRONIZATION ERROR | 00000015 |
| 2017/5/1 | 13:10:03 | FUNCTION UNIT | [CRITICAL] UNIT OUTPUT SYNCHRONIZATION ERROR | 00000015 |
| 2017/5/1 | 13:10:03 | FUNCTION UNIT | [CRITICAL] SLAVE COMMUNICATION ERROR | 00000021 |
| ... | ... | ... | ... | ... |

FIG.6

| 360 | 361 | 362 | 363 | 364 | 365 | 366 |
|---|---|---|---|---|---|---|
| 694138 | 2017/5/1 06:2:27. 821986 | OmronTat_8... 02:00:0a_8... | Broadcast | ECAT | 76 | 'FPWR': Len:2, Adp 0x3, Ado 0x120, Wc 0 |
| 694139 | 2017/5/1 06:2:27. 822203 | OmronTat_8... 02:00:0a_8... | Broadcast | ECAT | 76 | 'FPWR': Len:2, Adp 0x3, Ado 0x120, Wc 0 |
| 694140 | 2017/5/1 06:2:27. 822734 | OmronTat_8... 02:00:0a_8... | Broadcast | ECAT | 336 | 2 Cmds, 'LRD': len 24, 'FPRD': len 256 |
| 694141 | 2017/5/1 06:2:27. 822951 | OmronTat_8... 02:00:0a_8... | Broadcast | ECAT | 336 | 2 Cmds, 'LRD': len 24, 'FPRD': len 256 |
| 694142 | 2017/5/1 06:2:27. 823000 | OmronTat_8... 02:00:0a_8... | Broadcast | ECAT | 76 | 'FPWR': Len:2, Adp 0x17, Ado 0x120, Wc 0 |
| 694143 | 2017/5/1 06:2:27. 823217 | OmronTat_8... 02:00:0a_8... | Broadcast | ECAT | 76 | 'FPWR': Len:2, Adp 0x17, Ado 0x120, Wc 0 |
| 694144 | 2017/5/1 06:2:27. 823733 | OmronTat_8... 02:00:0a_8... | Broadcast | ECAT | 336 | 2 Cmds, 'LRD': len 24, 'FPRD': len 256 |
| 694145 | 2017/5/1 06:2:27. 823950 | OmronTat_8... 02:00:0a_8... | Broadcast | ECAT | 336 | 2 Cmds, 'LRD': len 24, 'FPRD': len 256 |
| 694146 | 2017/5/1 06:2:27. 823999 | OmronTat_8... 02:00:0a_8... | Broadcast | ECAT | 76 | 'FPWR': Len:2, Adp 0x26, Ado 0x120, Wc 0 |
| 694147 | 2017/5/1 06:2:27. 824216 | OmronTat_8... 02:00:0a_8... | Broadcast | ECAT | 76 | 'FPWR': Len:2, Adp 0x26, Ado 0x120, Wc 0 |
| 694148 | 2017/5/1 06:2:27. 824242 | OmronTat_8... 02:00:0a_8... | Broadcast | ECAT | 76 | 2 Cmds, 'FPWR': len 16, 'FPWR': len 1 |
| 694149 | 2017/5/1 06:2:27. 824459 | OmronTat_8... 02:00:0a_8... | Broadcast | ECAT | 76 | 2 Cmds, 'FPWR': len 16, 'FPWR': len 1 |
| ... | ... | ... | ... | ... | ... | ... |

| | 2017/5/1 13:00 |
|---|---|
| NUMBER OF ITEMS | |
| TOTAL NUMBER OF TRANSMITTED FRAMES | 197291757 |
| TOTAL NUMBER OF RECEIVED FRAMES | 197291646 |
| NUMBER OF TIMES OF FRAME RECEPTION TIMEOUT | 100 |
| NUMBER OF TIMES OF RECEPTION BUFFER OVERFLOW | 0 |
| NON-EtherCAT FRAME RECEPTION CIRCUIT | 0 |
| NUMBER OF TIMES OF LINK-OFF | 1 |
| NUMBER OF DISCARDED PROCESS DATA RECEPTIONS | 1841648 |
| NUMBER OF DISCARDED MESSAGE RECEPTIONS | 0 |
| NUMBER OF TIMES OF FAILURE OF REPEAT TRANSMISSION FRAME | 0 |
| NETWORK PROPAGATION DELAY TIME[ns] | 9708 |
| FIRST PDO COMMUNICATION CYCLE : TRANSMISSION CYCLE CURRENT VALUE[ns] | 1000160 |
| FIRST PDO COMMUNICATION CYCLE : TRANSMISSION CYCLE MAXIMUM VALUE[ns] | 1001216 |
| FIRST PDO COMMUNICATION CYCLE : TRANSMISSION CYCLE MINIMUM VALUE[ns] | 998800 |
| FIRST PDO COMMUNICATION CYCLE : TRANSMISSION JITTER[ns] | 160 |
| SECOND PDO COMMUNICATION CYCLE : TRANSMISSION CYCLE CURRENT VALUE[ns] | ----- |
| SECOND PDO COMMUNICATION CYCLE : TRANSMISSION CYCLE MAXIMUM VALUE[ns] | ----- |
| SECOND PDO COMMUNICATION CYCLE : TRANSMISSION CYCLE MINIMUM VALUE[ns] | ----- |
| SECOND PDO COMMUNICATION CYCLE : TRANSMISSION JITTER[ns] | ----- |
| NUMBER OF CRC ERROR FRAME RECEPTIONS | 0 |
| NUMBER OF FRAME RECEPTION ERRORS | 0 |
| NUMBER OF TIMES OF COLLISION | 0 |
| NUMBER OF SHORT FRAME RECEPTIONS | 0 |
| NUMBER OF FRAME MAXIMUM LENGTH EXCESS RECEPTIONS | 0 |

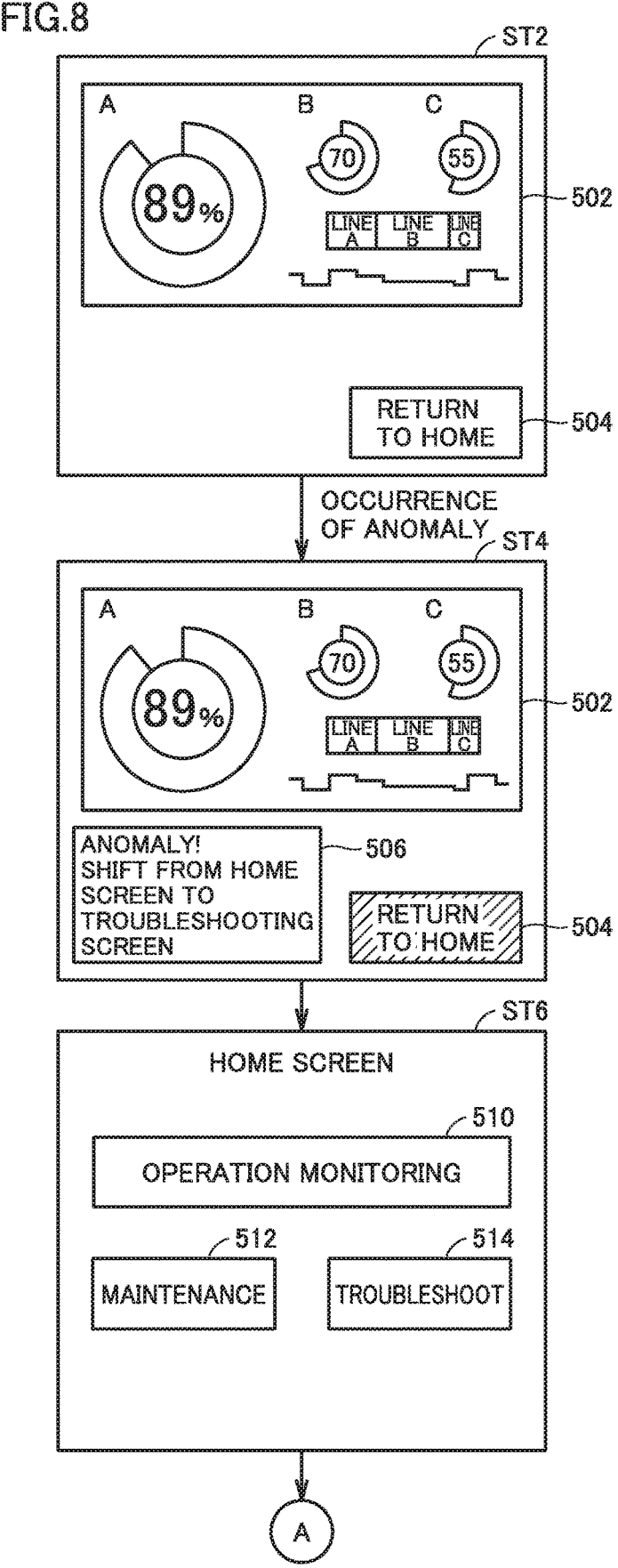

FIG.20

| NETWORK ADDRESS | DEVICE TYPE | DEVICE MODEL NUMBER | ATTACHMENT DATE | TOTAL OPERATION TIME | OPERATION TIME | ANOMALY HISTORY |
|---|---|---|---|---|---|---|
| 00 | TEMPERATURE CONTROLLER | PID-3317 | 2011/10/5 | 54,019 | 8,412 | — |
| 01 | TEMPERATURE CONTROLLER | PID-3317 | 2011/10/5 | 54,019 | 8,412 | — |
| 02 | COUPLER UNIT | NX-OC0582 | 2016/8/20 | 11,275 | 8,412 | 2017/1/29 10:48:25, EVENT CODE:000106 |
| 03 | SERVER DRIVER | SRV-882OC | 2011/10/5 | 54,019 | 8,412 | 2016/5/3 15:26:25, EVENT CODE:000067 |
| 03 | SERVER DRIVER | SRV-882OC | 2011/10/5 | 54,019 | 8,412 | — |
| ... | ... | ... | ... | ... | ... | ... |
| 441 | 442 | 443 | 444 | 445 | 446 | 447 |

44

CONTROL SYSTEM, INFORMATION PROCESSING DEVICE, AND ANOMALY FACTOR ESTIMATION PROGRAM

TECHNICAL FIELD

The present technology relates to a control system, an information processing apparatus, an anomaly factor estimation program, and a control method each supporting estimation of a factor of an anomaly phenomenon which may occur in a network.

BACKGROUND ART

An FA (Factory Automation) technology using a controller such as a PLC (programmable controller) is widely used in various production sites. Performance and functionality of the controller used in the FA field described above are improving with recent development of information communication technology (ICT: Information and Communication Technology).

Adoption of a large-scale system using a network is assumed as an example of the increase in performance and functionality of the controller. According to the networked controller described above, a large number of slaves are network-connected to a unit functioning as a master, for example.

When any communication error or the like occurs in the networked system described above, a time may be required to identify the cause of this error. For solving this problem, for example, Japanese Patent Laying-Open No. 2017-153050 (Patent Literature 1) discloses a master apparatus or the like capable of identifying a portion where a communication error has occurred regardless of whether being in operation or not in operation in an industrial network.

CITATION LIST

Patent Literature

PTL 1: Japanese Patent Laying-Open No. 2017-153050

SUMMARY OF INVENTION

Technical Problem

When any communication error occurs, a portion where the error has occurred can be easily identified using the master apparatus disclosed in Patent Literature 1 described above. However, with complication of networks, identification of a factor causing any communication error becomes more and more difficult.

The present technology provides a technology capable of easily identifying a factor having caused any anomaly phenomenon in a controller network-connected to one or more devices.

Solution to Problem

According to an aspect of the present invention, a control system for controlling a control target is provided. The control system includes a controller connected to one or more devices through a network, and an information processing apparatus connected to the controller. The controller maintains an event log containing an event occurred during a control operation, and network statistical information containing statistical information associated with data transmission on the network. The information processing apparatus includes a factor estimation unit that provides an interactive user interface in accordance with selection of an anomaly phenomenon registered in the event log. The factor estimation unit includes: means for accessing the event log and the network statistical information in the controller; means for presenting to a user, based on association between an anomaly phenomenon and one or more factors that cause the anomaly phenomenon, an action for identifying the factor having caused a target anomaly phenomenon from among one or more factor candidates associated with the target anomaly phenomenon; means for identifying, based on contents of the anomaly phenomenon registered in the event log, the factor having caused the target anomaly phenomenon from among the one or more factor candidates associated with the target anomaly phenomenon; and means for determining, based on the network statistical information, whether the target anomaly phenomenon is recovered by an action taken by the user.

According to this disclosure, it is easily identified which factor has caused the anomaly phenomenon which may occur in the network to which one or more devices are connected in the candidates of the factor having caused the anomaly phenomenon.

In the above disclosure, the factor estimation unit may present to the user, based on the contents of the anomaly phenomenon registered in the event log, the identified factor before presenting to the user the action for identifying the factor having caused the target anomaly phenomenon when the factor having caused the target anomaly phenomenon is identifiable.

According to this disclosure, the information processing apparatus can automatically identify the factor without the necessity of any action taken by the user. Therefore, identification of the factor is rapidly achievable.

In the above disclosure, the factor estimation unit may present to the user a plurality of factor candidates that are similar to each other and associated with the target anomaly phenomenon, and sequentially present to the user actions for the plurality of the factor candidates similar to each other.

According to this disclosure, a plurality of candidates of the factor which may cause the same anomaly phenomenon can be recognized in advance. Therefore, more convincing description can be provided for the user.

When the target anomaly phenomenon is recovered by execution of the action presented to the user in the above disclosure, the factor estimation unit may identify a factor associated with the action as the factor having caused the target anomaly phenomenon.

According to this disclosure, the factor corresponding to any action taken by the user is allowed to be determined as the factor to be identified when the anomaly phenomenon is recovered by the action taken by the user in accordance with an instruction received via the interactive user interface.

In the above disclosure, the factor estimation unit may evaluate, based on a state value in the network statistical information to determine whether the target anomaly phenomenon is recovered, a state of communication with a device associated with the target anomaly phenomenon to determine whether the target anomaly phenomenon is recovered.

According to this disclosure, more accurate identification of a factor is achievable by evaluating the communication state of the network.

In the above disclosure, the factor estimation unit may further include means for receiving selection of a skill level of the user. In this case, the factor estimation unit may vary contents of the interactive user interface in accordance with the selected skill level.

According to this disclosure, contents corresponding to the skill level of the user are presented. Therefore, an efficient action for the anomaly phenomenon can be taken without presenting a wasteful action exceeding the skill level of each user, for example.

In the above disclosure, the information processing apparatus may display a list of one or more events registered in the event log, and start provision of the interactive user interface corresponding to selection of the event displayed in the list.

According to this disclosure, the user can select an aimed event and identify a factor even during occurrence of a plurality of events. Therefore, the user can execute the anomaly factor estimation process at timing corresponding to priority or necessity.

According to another aspect of the present invention, an information processing apparatus connected to a controller that controls a control target is provided. The controller is connected to one or more devices through a network, and maintains an event log containing an event occurred during a control operation, and network statistical information containing statistical information associated with data transmission on the network. The information processing apparatus includes a factor estimation unit that provides an interactive user interface in accordance with selection of an anomaly phenomenon registered in the event log. The factor estimation unit includes: means for accessing the event log and the network statistical information in the controller; means for presenting to a user, based on association between an anomaly phenomenon and one or more factors that cause the anomaly phenomenon, an action for identifying a factor having caused a target anomaly phenomenon from among one or more factor candidates associated with the target anomaly phenomenon; means for identifying, based on contents of the anomaly phenomenon registered in the event log, the factor having caused the target anomaly phenomenon from among the one or more factor candidates associated with the target anomaly phenomenon; and means for determining, based on the network statistical information, whether the target anomaly phenomenon is recovered by an action taken by the user.

According to this disclosure, it is easily identified which factor has caused the anomaly phenomenon which may occur in the network to which one or more devices are connected in the candidates of the factor having caused the anomaly phenomenon.

According to a further aspect of the present invention, an anomaly factor estimation program executed by an information processing apparatus connected to a controller that controls a control target is provided. The controller is connected to one or more devices through a network, and maintains an event log containing an event occurred during a control operation, and network statistical information containing statistical information associated with data transmission on the network. The anomaly factor estimation program causes the information processing apparatus to execute a factor estimation process that provides an interactive user interface in accordance with selection of an anomaly phenomenon registered in the event log. The factor estimation process includes: accessing the event log and the network statistical information in the controller; presenting to a user, based on association between an anomaly phenomenon and one or more factors that cause the anomaly phenomenon, an action for identifying a factor having caused a target anomaly phenomenon from among one or more factor candidates associated with the target anomaly phenomenon; identifying, based on contents of the anomaly phenomenon registered in the event log, the factor having caused the target anomaly phenomenon from among the one or more factor candidates associated with the target anomaly phenomenon; and determining, based on the network statistical information, whether the target anomaly phenomenon is recovered by an action taken by the user.

According to this disclosure, it is easily identified which factor has caused the anomaly phenomenon which may occur in the network to which one or more devices are connected in the candidates of the factor having caused the anomaly phenomenon.

Advantageous Effects of Invention

The present technology can facilitate identification of a factor having caused any anomaly phenomenon occurred in a controller connected to one or more devices through a network.

BRIEF DESCRIPTION OF DRAWINGS

FIG. 5 is a diagram showing an example of data contents of an event log used in an anomaly factor estimation process according to the present embodiment.

FIG. 6 is a diagram showing an example of data contents of an access log used in the anomaly factor estimation process according to the present embodiment.

FIG. 7 is a diagram showing an example of data contents of network statistical information 38 used in the anomaly factor estimation process according to the present embodiment.

FIG. 8 is a schematic diagram showing an example of an interactive user interface provided in the anomaly factor estimation process according to the present embodiment.

FIG. 20 is a schematic diagram showing an example of an operation information database 44 in a modification of the control system according to the present embodiment.

DESCRIPTION OF EMBODIMENT

Figure 1:
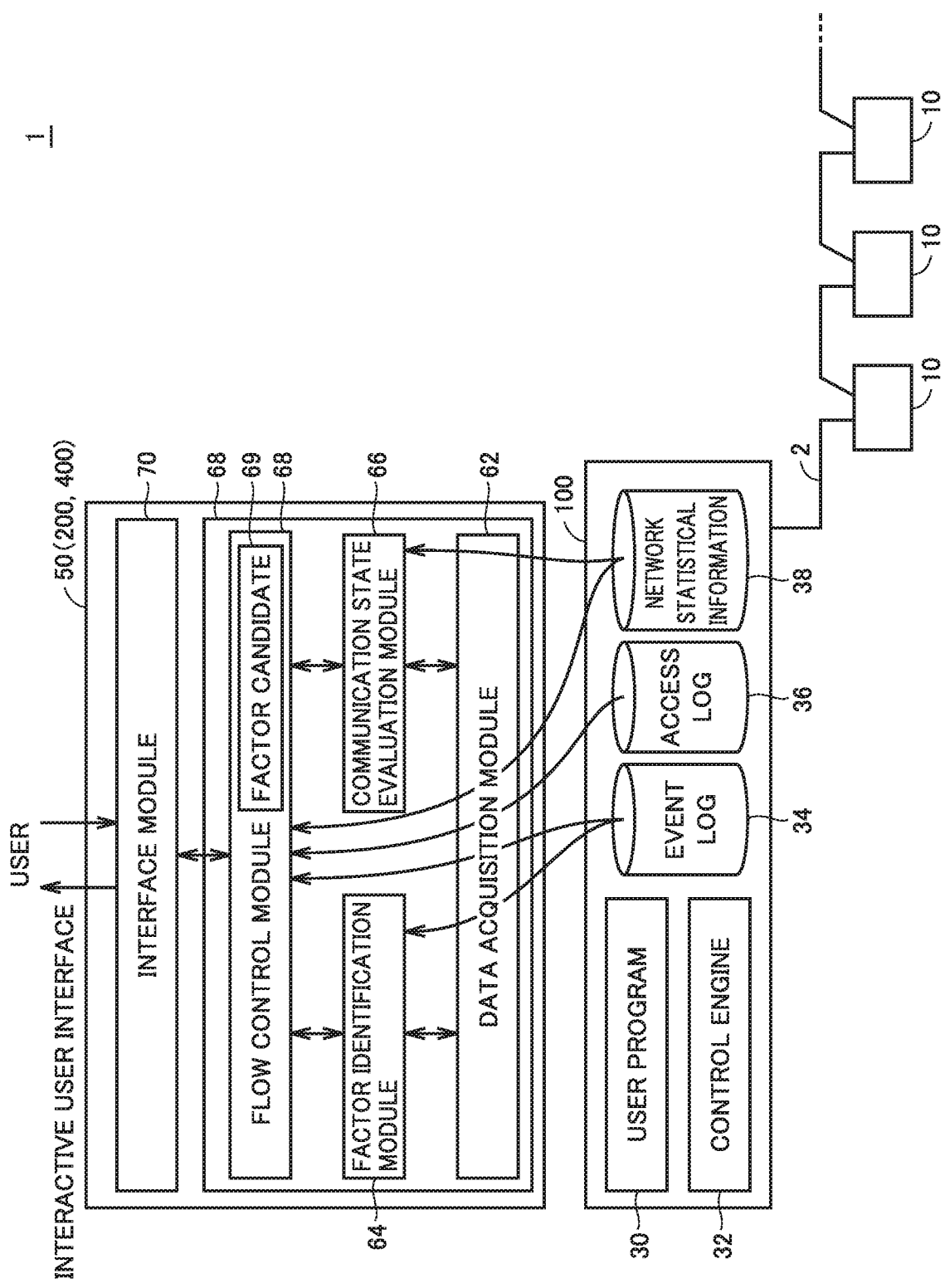
FIG. 1 is a functional block diagram showing an application example of a control system according to a present embodiment.

An embodiment of the present invention will be described in detail with reference to the drawings. Note that identical or corresponding parts in the drawings are given identical reference symbols, and description of these parts will not be repeated.

<A. Application Example>

An example of a situation to which the present invention is applied will be initially described. FIG. 1 is a functional block diagram showing an application example of a control system 1 according to the present embodiment.

Referring to FIG. 1, control system 1 according to the present embodiment controls a control target such as a facility and a manufacturing apparatus of various types. Control system 1 includes a controller 100, and an information processing apparatus 50 connected to controller 100.

Controller 100 may be embodied as a type of computer such as a PLC (programmable controller). Controller 100 has a user program 30 for controlling a control target. User program 30 is a command group generated as desired in accordance with a control target. Examples of user program 30 include a sequence program, a motion program, and an application program of various types, and others.

User program 30 is executed using a control engine 32 of controller 100. Control engine 32 provides an execution environment of a program for achieving a control process for a control target. Control engine 32 is typically produced in controller 100 by executing a system program using a processor, and/or utilizing a hardware circuit such as ASIC (Application Specific Integrated Circuit) or FPGA (Field-Programmable Gate Array). In addition, control engine 32 may provide a library, API (Application Programming Interface), and the like necessary for executing user program 30.

Controller 100 is connected to one or more devices 10 through a network.

In the present description, a "device" is a term containing an apparatus which exchanges data with controller 100, and achieves control for a control target while working for controller 100 dependently, or working as an independent device. Examples of device 10 include an apparatus which collects input data from a control target or a manufacturing apparatus or a production line associated with control (hereinafter also collectively referred to as a "field"). Examples assumed as an apparatus collecting input data as described above include an input relay and various types of sensors. Examples of device 10 further include an apparatus which gives any action to a field in accordance with output data (command value) determined by controller 100. Examples assumed as an apparatus giving any action to a field as described above include an output relay, a contactor, a servo driver, a servo motor, and any other actuators. Each of devices 10 described above exchanges data including input data and output data with controller 100 via a field network 2.

Controller 100 maintains an event log 34, an access log 36, and network statistical information 38. Event log 34 contains an event occurred during a control operation.

In the present description, "occurrence of an event" refers to matching between a predetermined condition and a phenomenon or state change occurred in any portion of control system 1. In addition, an "event" contains a phenomenon or state change occurred, and occurrence itself of a phenomenon or state change. Note that the predetermined condition may be set in advance by a manufacturer of controller 100 or of a device or a unit connected to controller 100, or may be any condition set by a user using controller 100.

Access log 36 contains a history of network accesses. Access log 36 contains a history of transmission and reception of packets and frames flowing on a network connected to controller 100 (hereinafter also referred to as "access history") in time series.

Network statistical information 38 contains statistical information associated with data transmission on the network. Network statistical information 38 contains statistical information indicating a state of transmission and reception of packets and frames flowing on the network connected to controller 100 in a predetermined period.

Examples of event log 34, access log 36, and network statistical information 38 will be described below. Note that an anomaly factor estimation process according to the present embodiment is providable even when only a part of event log 34, access log 36, and network statistical information 38 is used in a case where not all of these data is essential data.

Information processing apparatus 50 may be embodied as a type of computer having a function of exchanging data with controller 100. In the following embodiment, examples of apparatuses such as a support apparatus (a support apparatus 200 shown in FIG. 2) for achieving various operations for controller 100, a display apparatus (a display apparatus 400 shown in FIG. 2) providing an HMI (Human Machine Interface) function in linkage with controller 100, and a portable terminal apparatus (a portable terminal apparatus 500 shown in FIG. 15) which directly communicates with controller 100 or indirectly communicates with controller 100 via another information processing apparatus will be described as typical examples of information processing apparatus 50. However, the respective apparatuses are not limited to these examples but may be any computers.

More specifically, information processing apparatus 50 includes a factor estimation module 60 and an interface module 70 as functional constituents.

When any anomaly phenomenon registered in event log 34 stored in controller 100 is selected, factor estimation module 60 provides an interactive user interface corresponding to the selected anomaly phenomenon.

Interface module 70 provides contents of a user interface provided by factor estimation module 60 for the user (gives visual and/or audio output), and receives an operation or the like from the user. Interface module 70 typically issues a command for presenting a user interface to not-shown display unit and audio output unit, and also receives an operation performed by the user using a not-shown keyboard, mouse or the like and outputs operation contents to factor estimation module 60.

Factor estimation module 60 includes a data acquisition module 62, a factor identification module 64, a communication state evaluation module 66, and a flow control module 68. Flow control module 68 in factor estimation module 60 mainly controls data acquisition module 62, factor identification module 64, and communication state evaluation module 66 to provide an interactive user interface for the user.

Data acquisition module 62 achieves a process for accessing event log 34, access log 36, and network statistical information 38 of controller 100. Flow control module 68 manages provision of an interactive user interface. More specifically, flow control module 68 presents to the user, based on association between an anomaly phenomenon and one or more factors having caused the anomaly phenomenon, an action for identifying a factor having caused a target anomaly phenomenon from among one or more factor candidates 69 associated with the target anomaly phenomenon.

Factor identification module 64 identifies, based on contents of the anomaly phenomena registered in event log 34, a factor having caused a target anomaly phenomenon from among one or more factor candidates 69 associated with the target anomaly phenomenon in linkage with flow control module 68.

Communication state evaluation module 66 evaluates, based on network statistical information 38, a communication state of a target communication path. In this manner, it can be determined whether an action taken by the user has recovered from a target anomaly phenomenon.

According to control system 1 of the present embodiment, controller 100 collects a plurality of data each of which is independently managed, and provides an interactive user interface for identifying a factor having caused a selected event (anomaly phenomenon). By using the interactive user interface described above, even a user with little expertise can easily identify a factor having caused a target anomaly phenomenon in a shorter time, and can rapidly take an action for the identified factor (for example, replacement or power reset).

<B. Overall Configuration Example of Control System>

An overall configuration example of control system 1 including the controller according to the present embodiment will be initially described.

Figure 2:
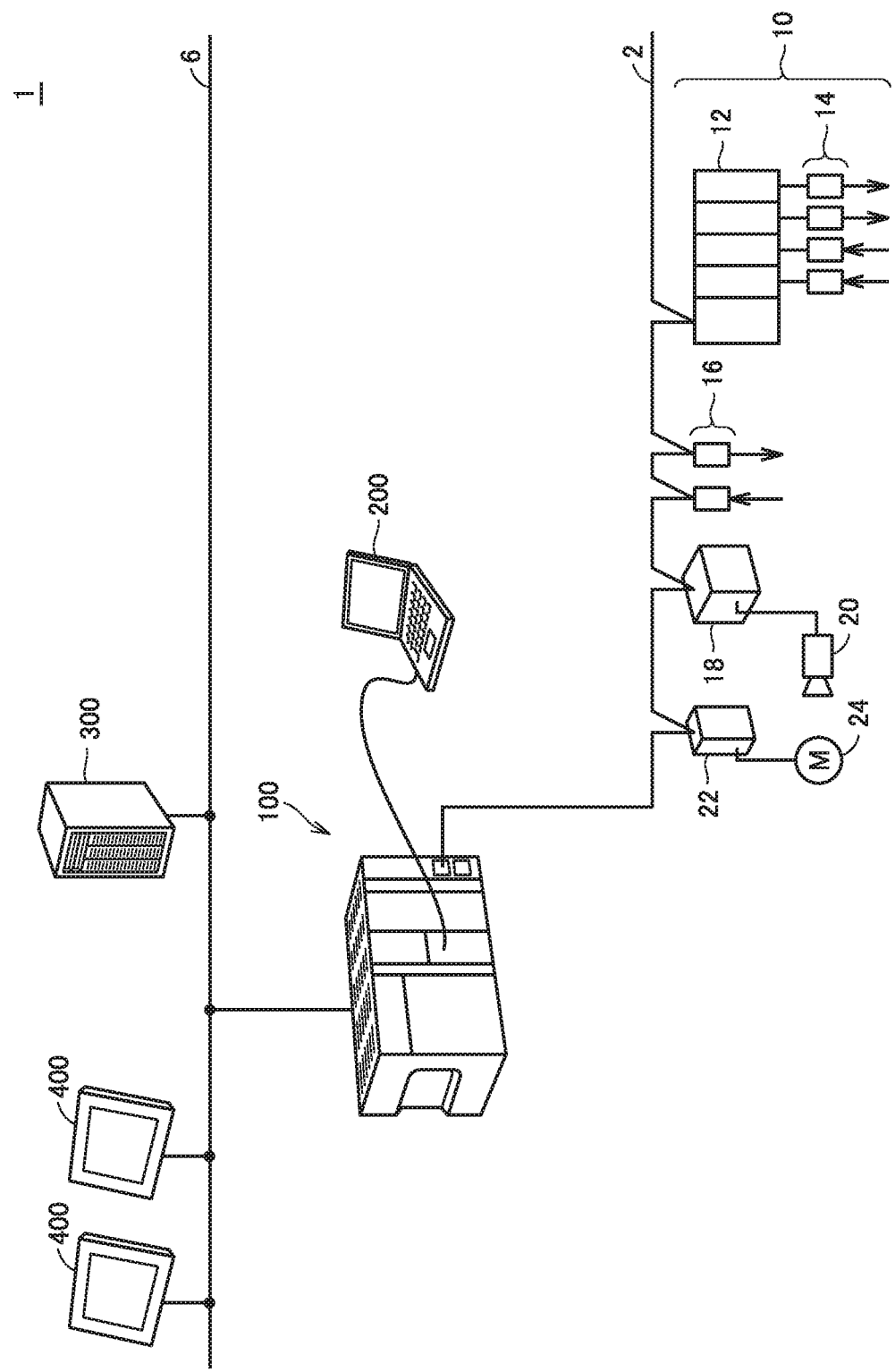
FIG. 2 is a schematic diagram showing an overall configuration example of the control system according to the present embodiment.

FIG. 2 is a schematic diagram showing an overall configuration example of control system 1 according to the present embodiment. Referring to FIG. 2, control system 1 includes controller 100 network-connected. In one example, controller 100 is connected to one or more devices 10 via field network 2 as a network connection. Controller 100 may be further connected to a server apparatus 300 for managing production and collecting various data, and one or more display apparatuses 400 via an upper network 6. Controller 100 exchanges data with each of the connected apparatuses via the corresponding network. Note that server apparatus 300 and display apparatus 400 are optional constituents, and are not essential constituents of control system 1. In addition, support apparatus 200 is connected to controller 100 in some cases.

Controller 100 cyclically executes a series of control processes for collecting measurement values, state values and the like (hereinafter also referred to as "input data") from a control target in accordance with a user program prepared in advance, executing a control calculation based on the collected input data, and outputting command values and state values (hereinafter also referred to as "output data") obtained by execution of the control calculation to the control target.

It is preferable that field network 2 adopts a network which performs fixed-cycle communication which guarantees data arrival time. Known examples of the network which performs the fixed-cycle communication described above include EtherCAT (registered trademark), EtherNet/IP (registered trademark), DeviceNet (registered trademark), and CompoNet (registered trademark).

According to the configuration example shown in FIG. 2, device 10 includes a remote I/O (Input/Output) apparatus 12, a relay group 14, an image sensor 18 and a camera 20, a servo driver 22, and a servo motor 24.

Remote I/O apparatus 12 includes a communication unit which communicates via field network 2, and an input/output unit (hereinafter also referred to as an "I/O unit") for acquiring input data and outputting output data. Input data and output data are exchanged between controller 100 and a field via the I/O unit described above.

The I/O unit may be directly connected to the field network. FIG. 2 shows an example which directly connects an I/O unit 16 to field network 2.

Image sensor 18 performs an image measuring process such as pattern matching for image data captured by camera 20, and transmits a processing result to controller 100.

Servo driver 22 drives servo motor 24 in accordance with output data (for example, position command) received from controller 100.

As described above, data is exchanged between controller 100 and device 10 via field network 2.

Support apparatus 200 provides functions such as development and debugging of a user program executed by controller 100. In addition, support apparatus 200 is an example of information processing apparatus 50 shown in FIG. 1, and provides the anomaly factor estimation process according to the present embodiment. Details of the anomaly factor estimation process according to the present embodiment will be described below.

Server apparatus 300 is connected to controller 100 via upper network 6, and exchanges necessary data with controller 100. Server apparatus 300 may have a database function, for example, and collect an event log and the like output from controller 100 in a time series.

Display apparatus 400 connected to controller 100 via upper network 6 receives an operation from the user, and transmits a command or the like corresponding to an operation performed by the user for controller 100, and also graphically displays a calculation result and the like obtained by controller 100. In addition, display apparatus 400 is an example of information processing apparatus 50 shown in FIG. 1, and provides the anomaly factor estimation process according to the present embodiment. Details of the anomaly factor estimation process according to the present embodiment will be described below.

<C. Hardware Configuration Examples of Respective Apparatuses>

Described next will be a hardware configuration example of the main apparatuses constituting control system 1 according to the present embodiment.

(c1: Hardware Configuration Example of Controller 100)

Figure 3:
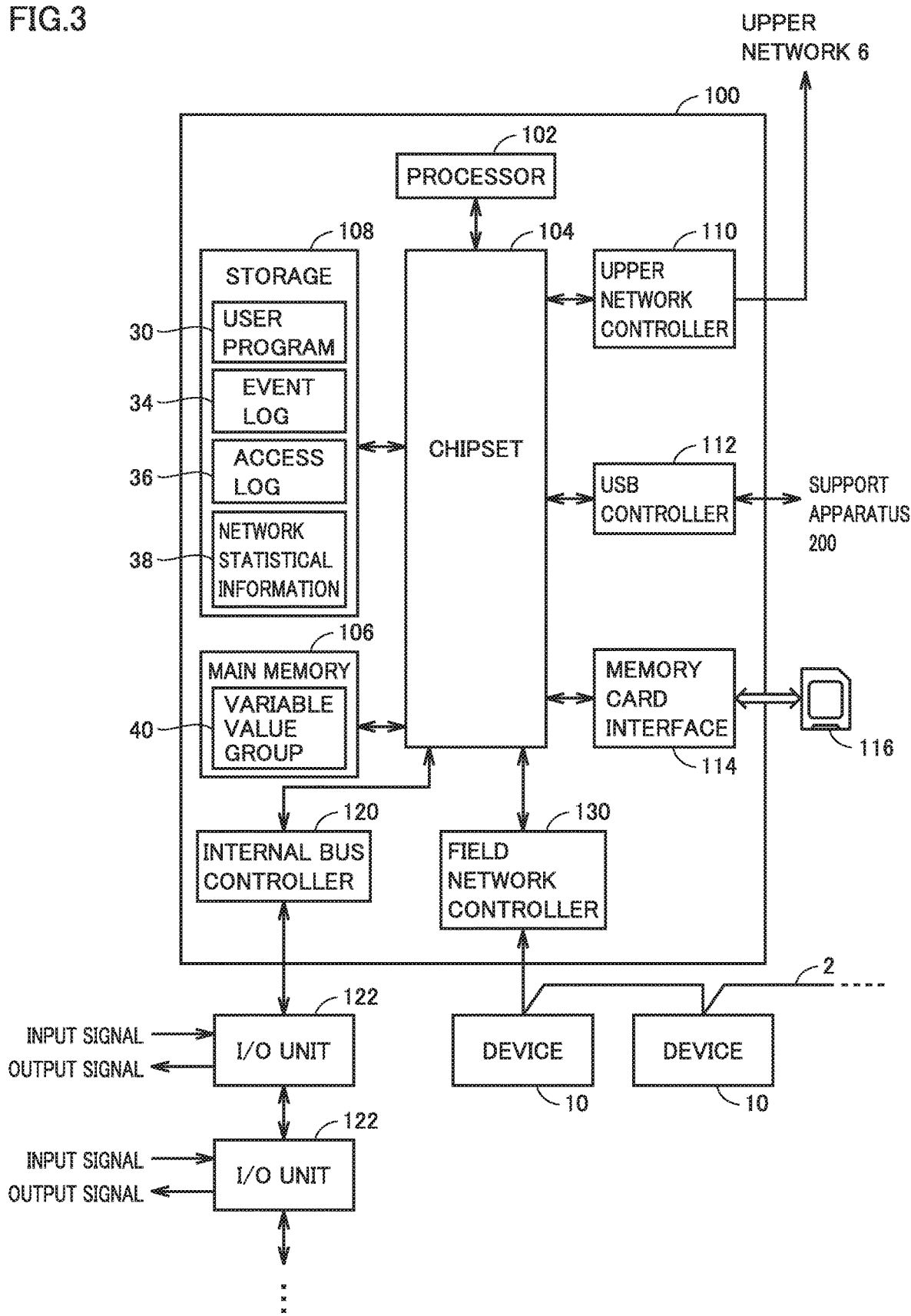
FIG. 3 is a block diagram showing a hardware configuration example of a controller constituting the control system according to the present embodiment.

FIG. 3 is a block diagram showing a hardware configuration example of controller 100 constituting control system 1 according to the present embodiment. Referring to FIG. 3, controller 100 includes a processor 102 such as a CPU (Central Processing Unit) and an MPU (Micro-Processing Unit), a chipset 104, a main memory 106, a storage 108, and an upper network controller 110, a USB (Universal Serial Bus) controller 112, a memory card interface 114, an internal bus controller 120, and a field network controller 130.

Processor 102 reads various programs stored in storage 108, expands the programs in main memory 106, and executes the programs to achieve control corresponding to a control target and various processes described below. Chipset 104 achieves overall processes of controller 100 by controlling processor 102 and respective components.

Storage 108 stores user program 30 created as desired in correspondence with a control target, in addition to an OS (Operating System) and a system program. Storage 108 further stores event log 34, access log 36, and network statistical information 38.

Upper network controller 110 controls data exchange with other apparatuses via upper network 6.

USB controller 112 controls data exchange with support apparatus 200 via USB connection.

Memory card interface 114 is configured such that a memory card 116 is detachable from memory card interface 114, and is capable of writing data to memory card 116, and reading various data (user program, trace data and the like) from memory card 116.

Internal bus controller 120 is an interface for exchanging data with I/O units 124-1, 124-2, and others attached to controller 100.

Field network controller 130 controls data exchange with other apparatuses via field network 2.

FIG. 3 shows a configuration example where processor 102 executes a program to provide necessary functions. However, a part or all of the provided functions may be achieved using a dedicated hardware circuit (for example, ASIC or FPGA). Alternatively, a main part of controller 100 may be achieved using hardware (for example, an industrial personal computer based on a general-purpose personal computer) having general-purpose architecture. In this case, adoptable is such a configuration which executes a plurality of OSs for different use purposes in parallel, and also executes a required application on each of the OSs using a virtualization technology.

(c2: Hardware Configuration Example of Support Apparatus 200)

For example, support apparatus 200 according to the present embodiment is achieved by executing a program using hardware (for example, general-purpose personal computer) having general-purpose architecture.

Figure 4:
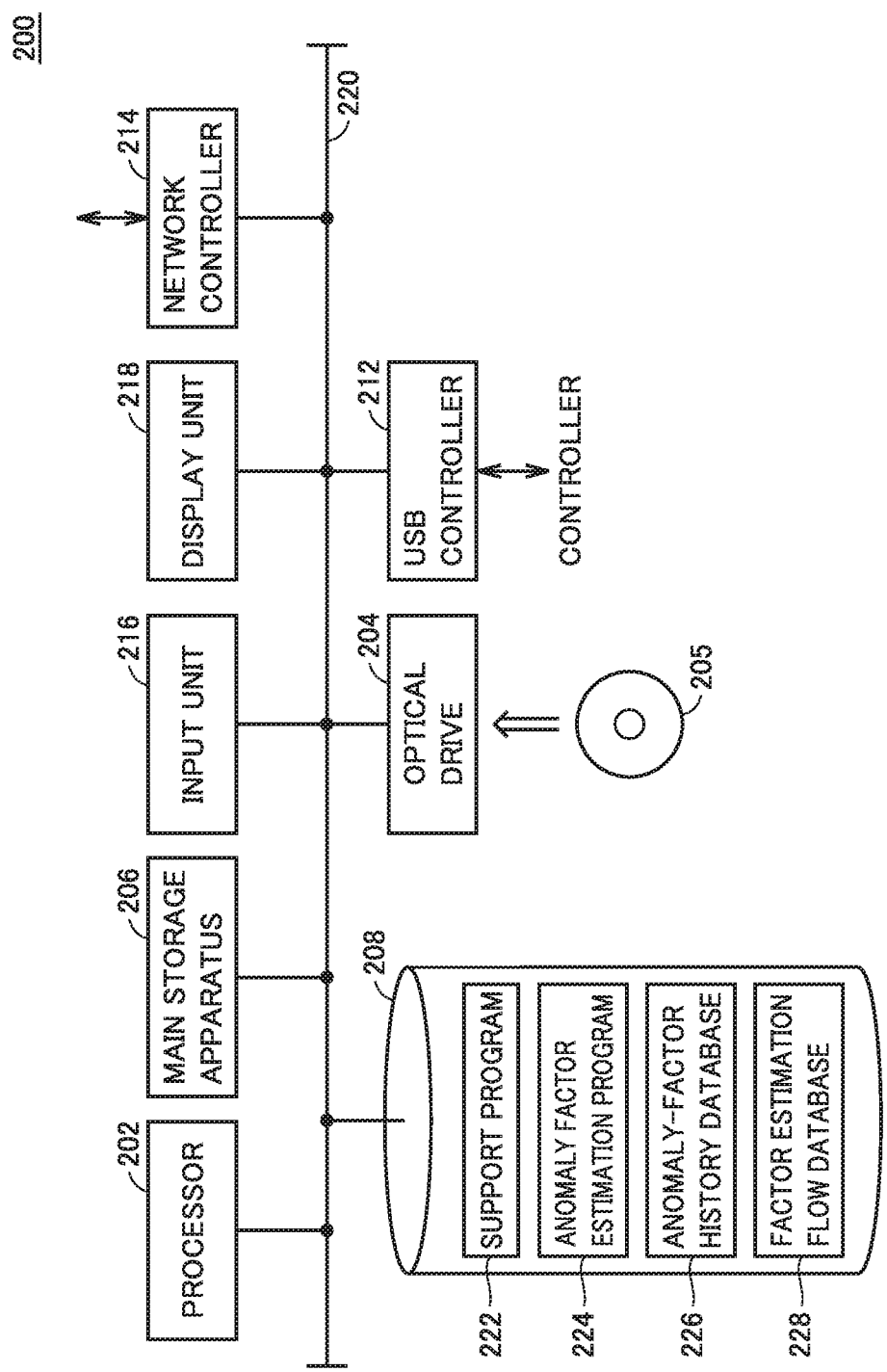
FIG. 4 is a block diagram showing a hardware configuration example of a support apparatus constituting the control system according to the present embodiment.

FIG. 4 is a block diagram showing a hardware configuration example of support apparatus 200 constituting control system 1 according to the present embodiment. Referring to FIG. 4, support apparatus 200 includes a processor 202 such as a CPU and an MPU, an optical drive 204, a main memory 206, a storage 208, a USB controller 212, a network controller 214, an input unit 216, and a display unit 218. These components are connected to each other via a bus 220.

Processor 202 reads various programs stored in storage 208, expands the programs in main memory 206, and executes the programs to achieve various processes described below.

For example, storage 208 is constituted by an HDD (Hard Disk Drive) or an SSD (Flash Solid State Drive). Storage 208 typically stores a support program 222 for creating a user program executed by support apparatus 200, debugging the created program, defining a system configuration, setting various parameters, and the like. Storage 208 further stores an anomaly factor estimation program 224 for achieving the anomaly factor estimation process. Storage 208 may store an OS and other necessary programs.

Support apparatus 200 includes optical drive 204. A program stored in a recording medium 205 (for example, optical recording medium such as a DVD (Digital Versatile Disc)) storing computer-readable programs in a non-transitory manner is read from recording medium 205, and installed in storage 208 or the like.

Respective programs executed by support apparatus 200 may be installed via computer-readable recording medium 205, or may be downloaded from a server apparatus or the like on a network to be installed. In addition, the functions provided by support apparatus 200 according to the present embodiment are achieved by using a part of modules provided by the OS in some cases.

USB controller 212 controls data exchange with controller 100 via USB connection. Network controller 214 controls data exchange with other apparatuses via any network.

Input unit 216 is constituted by a keyboard, a mouse, and the like, and receives an operation from the user. Display unit 218 is constituted by a display, various indicators, a printer, and the like, and outputs a processing result received from the processor 202 and the like.

FIG. 4 shows a configuration example where processor 202 executes a program to provide necessary functions. However, a part or all of the provided functions may be implemented using a dedicated hardware circuit (for example, ASIC or FPGA).

(c3: Hardware Configuration Example of Server Apparatus 300)

For example, server apparatus 300 constituting control system 1 according to the present embodiment may be achieved using a general-purpose file server or database server. The hardware configuration of the apparatus described above is known, and therefore will not be described in detail herein.

(c4: Hardware Configuration Example of Display Apparatus 400)

Display apparatus 400 constituting control system 1 according to the present embodiment is called an HMI (Human Machine Interface) apparatus. Display apparatus 400 may adopt a constituent implemented as a dedicated machine, or may be achieved using hardware (for example, an industrial personal computer based on a general-purpose personal computer) having general-purpose architecture.

When display apparatus 400 is achieved using an industrial personal computer based on a general-purpose personal computer, a hardware configuration similar to that of support apparatus 200 shown in FIG. 4 as described above is adopted. However, a program for achieving the HMI function is installed instead of support program 222 in the configuration example shown in FIG. 4.

<D. Anomaly Factor Estimation Process>

Described in detail next will be processing contents of the anomaly factor estimation process according to the present embodiment. Information processing apparatus 50 according to the present embodiment provides an interactive user interface.

(d1: Data Contents)

In the anomaly factor estimation process according to the present embodiment, controller 100 collectively uses event log 34, access log 36, and network statistical information 38 each collected independently to provide an interactive user interface for estimating an anomaly factor while referring to an anomaly-factor history database 226 and a factor estimation flow database 228.

Contents of respective data used in the anomaly factor estimation process according to the present embodiment will be initially described.

FIG. 5 is a diagram showing an example of data contents of event log 34 used in an anomaly factor estimation process according to the present embodiment. Referring to FIG. 5, event log 34 contains contents of events occurred in control system 1 in time series.

For example, event log 34 contains a time field 340, a source field 341, a content field 342, and an event code field 343.

Time field 340 contains times at which respective events have occurred. Source field 341 contains information for identifying locations where respective events have occurred. Content field 342 contains information indicating contents of respective events. Generally, information stored in content field 342 is set in advance. Event code field 343 contains identification information for identifying types of respective events.

FIG. 6 is a diagram showing an example of data contents of access log 36 used in the anomaly factor estimation process according to the present embodiment. Referring to FIG. 6, access log 36 includes a serial number field 360, a time field 361, an address field 362, a type field 363, a protocol field 364, a port field 365, and a content field 366.

Serial number field 360 contains serial numbers as identification information for identifying target access histories. Time field 361 contains times at which respective access histories have occurred. Address field 362 contains addresses (physical addresses and/or network addresses) indicating transmission destinations or reception sources of target packets or target frames of respective access histories. Type field 363 contains information indicating types of target packets or target frames of respective access histories. Protocol field 364 contains information indicating a protocol used for transmission and reception of target packets or target frames of respective accelerator histories. Port field 365 contains port numbers used for transmission and reception of target packets or target frames of respective accelerator histories. Content field 366 contains all or a part (for example, header information or preambles) of contents of target packets or target frames of respective accelerator histories.

While FIG. 6 shows an example which monitors packets or frames flowing on a single network for convenience of description, a plurality of networks may be monitored in parallel. In this case, access log 36 contains a mixture of histories of packets or frames flowing on different networks.

FIG. 7 is a diagram showing an example of data contents of network statistical information 38 used in the anomaly factor estimation process according to the present embodiment. Referring to FIG. 7, network statistical information 38 contains statistical information indicating a total number of transmitted and received frames, the number of times of occurrence of frame reception timeout, a current value of a transmission cycle, a minimum value, a maximum value, the number of times of occurrence of an error during frame reception, and others.

(d2: Interactive User Interface)

Described next will be an example of an interactive user interface provided in the anomaly factor estimation process according to the present embodiment.

Each of FIGS. 8 to 11 is a schematic diagram showing an example of an interactive user interface provided by the anomaly factor estimation process according to the present embodiment. The process shown in FIGS. 8 to 11 may be typically achieved by executing an anomaly factor estimation program (for example, anomaly factor estimation program 224 shown in FIG. 4) using a processor of information processing apparatus 50 (typically support apparatus 200 or display apparatus 400, for example).

Each of FIGS. 8 to 11 shows a case where any anomaly phenomenon has occurred in data communication (hereinafter also referred to as "process data communication") via field network 2. A display screen shown in each of FIGS. 8 to 11 is typically displayed on display apparatus 400.

In a state ST2 of FIG. 8, a display screen for monitoring an operation of a control target is presented. The display screen in state ST2 includes a home button 504 in addition to an operation monitoring object 502.

In state ST2, it is assumed that any anomaly phenomenon has occurred in field network 2 itself or any device (or unit) (a term simply described as a "device" hereinafter includes not only a device but also a unit) connected to field network 2. In this case, the display screen changes to a display screen shown in a state ST4. Displayed in the display screen in state ST4 is a message 506 for giving a notification that an anomaly phenomenon has occurred, and urging execution of troubleshooting to take an action for the anomaly, in addition to the display screen in state ST2. When the user selects home button 504 in response to message 506, the display screen changes to a display screen shown in a state ST6.

The display screen in state ST6 is an example of a home screen where a button 510 for selecting an operation monitoring screen shown in state ST2, a button 512 for enabling a maintenance mode for providing various settings and the like, and a button 514 for enabling a troubleshooting mode for achieving the anomaly factor estimation process according to the present embodiment are arranged in a selectable manner. When the user selects button 514, the screen shifts to a display screen shown in FIG. 9.

Figure 9:
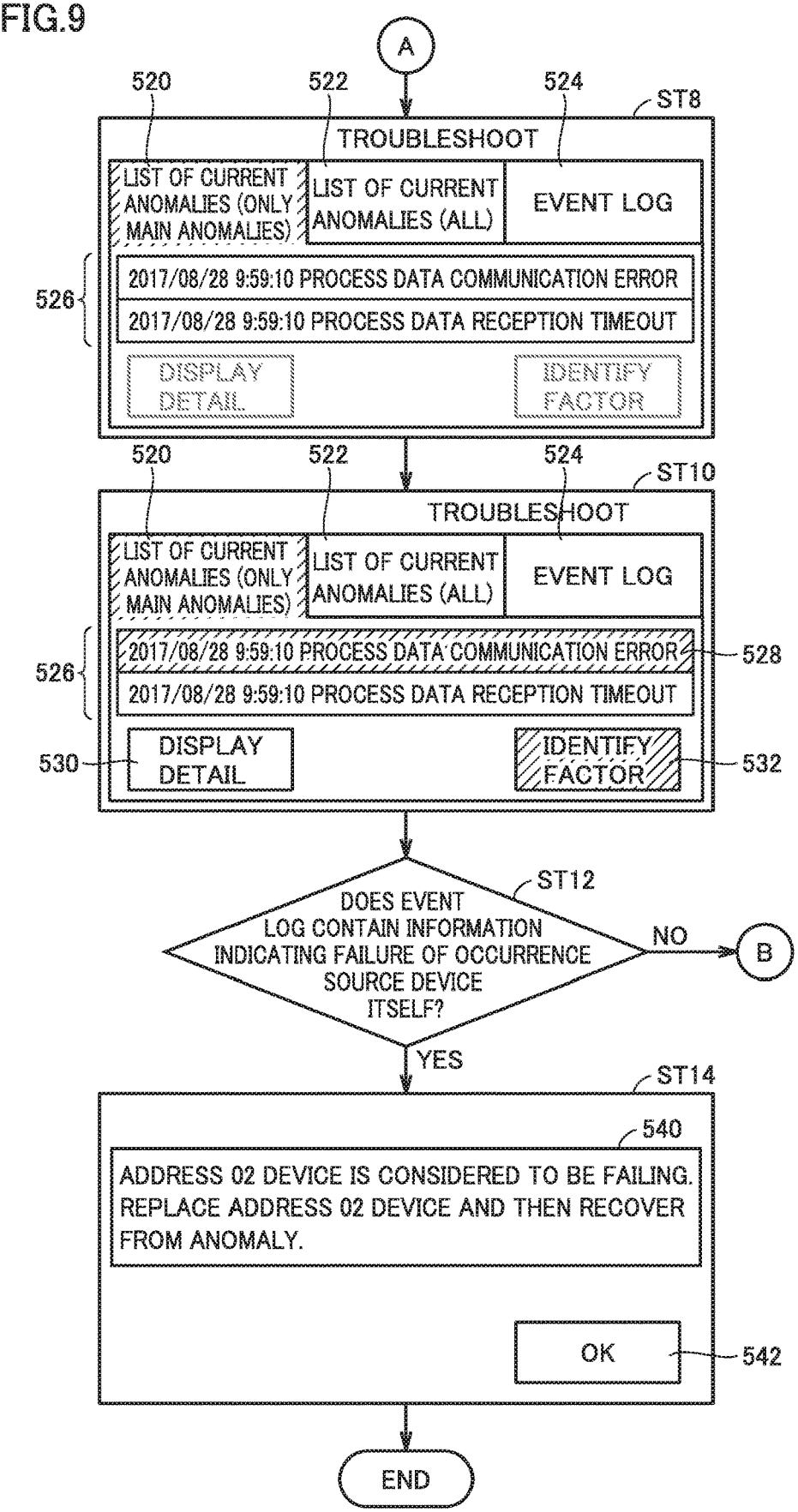
FIG. 9 is a schematic diagram showing an example of the interactive user interface provided in the anomaly factor estimation process according to the present embodiment.

Referring to FIG. 9, a display screen for checking contents of the anomaly phenomenon occurred is presented in a state ST8. The display screen in state ST8 includes a tab 520 for displaying a list of main anomaly phenomena currently occurring, a tab 522 for displaying a list of anomalies currently occurring, and a tab 524 for displaying a list of contents of event logs.

When tab 520 is selected, main anomaly messages of anomaly messages currently occurring are displayed. When any anomaly phenomenon occurs, anomaly phenomena may be derived from this anomaly and caused in associated parts or processes. Anomalies derived in this manner and simplified based on an occurrence time and an occurrence location are designated as the main anomaly messages.

Tab 520 is selected in the display screen in state ST8, and a list of the main anomaly messages of the anomaly messages currently occurring is displayed in a display area 526. When the user selects an anomaly message 528 indicating "anomaly process data communication" displayed in display area 526 in this state, the display screen changes to a display screen shown in a state ST10.

A button 530 for displaying details of selected anomaly message 528, and a button 532 for executing the anomaly factor estimation process for selected anomaly message 528 are selectable in the display screen shown in state ST10. When the user selects button 532 in this state, a substantive process of the anomaly factor estimation process according to the present embodiment starts. In this manner, provision of the interactive user interface starts in accordance with selection of the anomaly phenomenon registered in event log 34. Specifically, information processing apparatus 50 displays a list of one or more events registered in event log 34, and starts provision of the interactive user interface corresponding to selection from the events displayed in the list.

Initially, event log 34, access log 36, network statistical information 38, and the like retained in controller 100 are collected. Specifically, information processing apparatus 50 accesses event log 34, access log 36, and network statistical information 38 included in controller 100. Thereafter, necessary processing is executed based on these collected data. More specifically, as will be described below, information processing apparatus 50 presents to the user, based on association between an anomaly phenomenon and one or more factors causing the anomaly phenomenon, an action for identifying a factor having caused a target anomaly phenomenon from among one or more factor candidates associated with the target anomaly phenomenon. Thereafter, information processing apparatus 50 identifies, based on contents of the anomaly phenomenon registered in event log 34, the factor having caused the target anomaly phenomenon from among the one or the plurality of factor candidates associated with the target anomaly phenomenon. (However, the factor cannot be identified in some cases).

In this example of anomaly process data communication, the device having caused the anomaly process data communication is initially identified based on contents of the event in event log 34, and a failure of the device itself as the identified anomaly source is determined. More specifically, it is determined whether information indicating that the device itself as the anomaly source has failed is contained in event log 34 (state ST12). A failure of any device itself may cause anomaly process data communication. In this case, it is initially determined whether information indicating the failure of the device itself is contained in event log 34.

When information indicating that the device itself as the anomaly source has failed is contained in event log 34 (YES in state ST12), the display screen changes to a display screen shown in a state ST14.

The display screen shown in state ST14 is displayed when the device itself having caused the anomaly phenomenon has failed, and the anomaly factor estimation process ends in this stage. Specifically, displayed in the display screen shown in state ST14 is a message 540 for giving a notification that the anomaly factor is a failure of the identified device itself, and urging replacement of the device having failed. The display screen shown in state ST14 includes a button 542 for accepting an agreement from the user. The user replaces the device determined to be faulty, performs a reset operation as necessary, and then selects button 542 to end the anomaly factor estimation process.

Note that a screen for supporting replacement of the device determined to be faulty, such as a screen showing a position where the device to be replaced is attached, a screen showing device replacement procedures, and a screen showing reset procedures may be displayed in the display screen shown in state ST14 in accordance with a user request, for example.

As shown in state ST14, information processing apparatus 50 presents to the user the identified factor before presenting to the user an action for identifying the factor having caused the target anomaly phenomenon when the factor having caused the target anomaly phenomenon is identifiable based on the contents of the anomaly phenomenon registered in event log 34. When this identifying process is available, the user is allowed to identify the factor without taking any actions.

Figure 10:
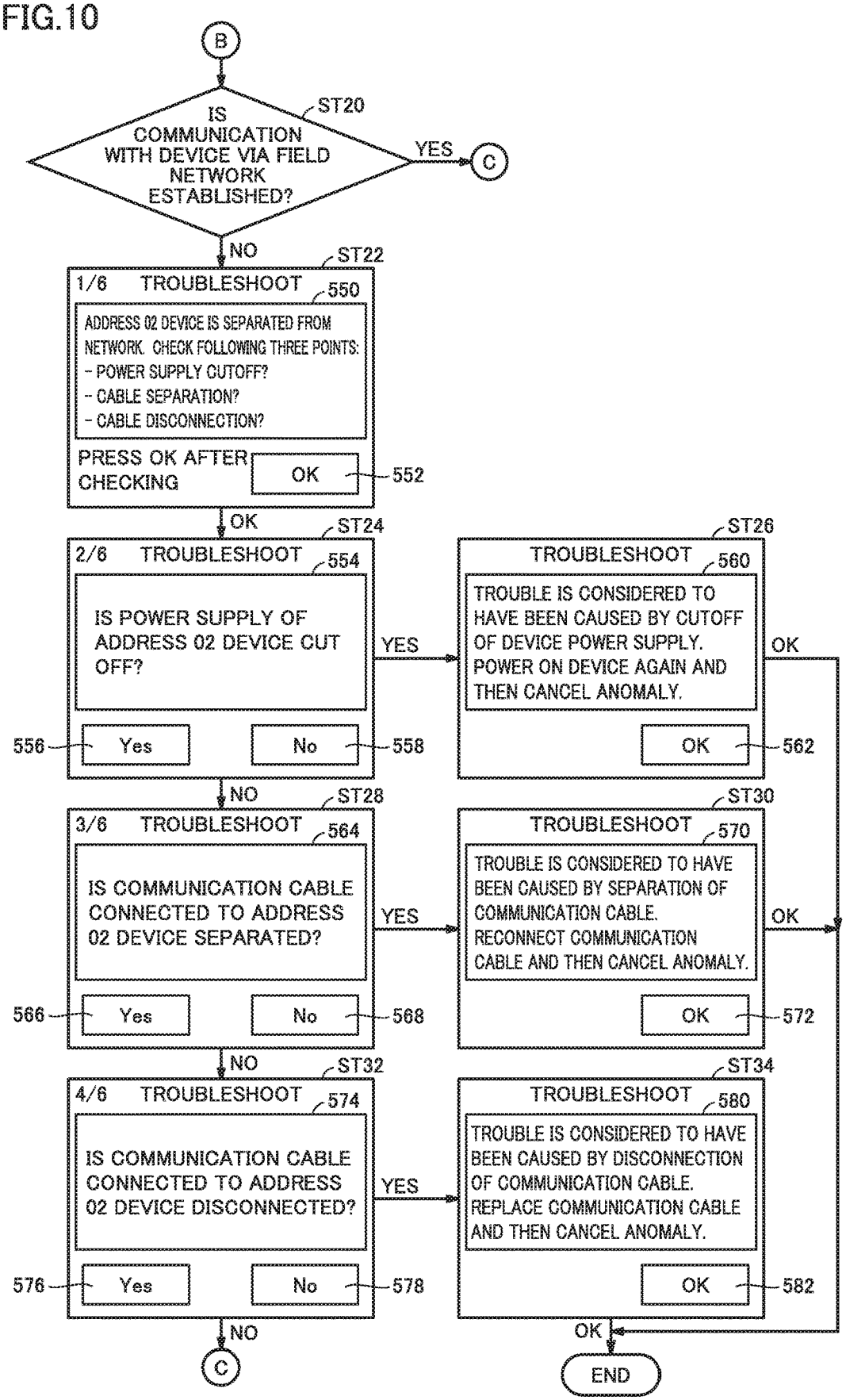
FIG. 10 is a schematic diagram showing an example of the interactive user interface provided in the anomaly factor estimation process according to the present embodiment.

On the other hand, when event log 34 does not contain information indicating that the device itself as the anomaly source has failed (NO in state ST12), the display screen shifts to a display screen shown in FIG. 10.

Referring to FIG. 10, it is determined whether communication with the device corresponding to the source of the anomaly process data communication has been established via field network 2 (state ST20). This determination is executed based on a communication history with the target device stored in access log 36 and/or system variables (flag values indicating the network state or the like) in a variable value group 40.

When communication with the device as the source of the anomaly process data communication has not been established via field network 2 (NO in state ST20), the display screen changes to a display screen shown in a state ST22.

Displayed in the display screen in state ST22 is a message 550 for giving a notification that the target device is separated from the field network, and urging a check on each of three factors each assumed as a cause of this separation. In this example, the listed three factors are (1) cutoff of a power supply, (2) connection separation of a communication cable, and (3) disconnection of the communication cable. The user performs checking and status input for these three factors.

Initially, when the user selects a button 552 in the display screen in state ST22, the screen changes to a display screen shown in a state ST24. Displayed in the display screen in state ST24 is a message 554 for urging a check to determine whether the power supply has been cut off. The user visually checks the target device, and selects a button 556 indicating YES when power supply is cut off, or selects a button 558 indicating NO when power supply is not cut off.

When button 556 is selected in the display screen in state ST24, the display screen changes to a display screen shown in a state ST26.

The display screen shown in state ST26 is displayed when a cutoff of the power supply of the target device is identified as an anomaly factor. The anomaly factor estimation process ends in this stage. Specifically, displayed in the display screen shown in state ST26 is a message 560 for giving a notification that the anomaly factor is power supply cutoff of the identified device, and urging power-on of the power-off device again. The display screen shown in state ST26 includes a button 562 for accepting an agreement from the user. The user again turns on the power supply of the power-cutoff device, and performs a reset operation as necessary, and then selects button 562 to end the anomaly factor estimation process.

Note that a screen for supporting power-on of the powered-off device again, such as a screen showing a position of supply of power to the target device and a screen showing reset procedures, may be displayed in the display screen shown in state ST26 in accordance with a request from the user, for example.

On the other hand, when the user selects button 558 in the display screen in state ST24, the screen changes to a display screen shown in a state ST28. Displayed in the display screen in state ST28 is a message 564 for urging a check to determine whether connection of the communication cable connected to the target device has been separated. The user visually checks the target device, and selects a button 566 indicating YES in a case of connection separation of the communication cable, or selects a button 568 indicating NO not in the case of connection separation.

When button 566 is selected in the display screen in state ST28, the display screen changes to a display screen shown in a state ST30.

The display screen shown in state ST30 is displayed when connection separation of the communication cable connected to the target device is identified as an anomaly factor. The anomaly factor estimation process ends in this stage.

Specifically, displayed in the display screen shown in state ST26 is a message 570 for giving a notification that the anomaly factor is connection separation of the communication cable of the identified device, and urging reconnection of the communication cable to the device from which the communication cable has been separated. The display screen shown in state ST30 includes a button 572 for accepting an agreement from the user. The user reconnects the communication cable to the device from which the communication cable has been separated, and performs a reset operation as necessary, and then selects button 572 to end the anomaly factor estimation process.

Note that a screen for supporting reconnection of the communication cable to the device from which the communication cable has been separated, such as a screen showing a position of connection between the target device and the communication cable, and a screen showing reset procedures may be displayed in the display screen shown in state ST30 in accordance with a request from the user, for example. Moreover, the network configuration and the apparatus configuration may be schematically displayed for visual notification of the position of the cable.

On the other hand, when the user selects button 568 in the display screen in state ST28, the screen changes to a display screen shown in a state ST32. Displayed in the display screen in state ST32 is a message 574 for urging a check to determine whether the communication cable connected to the target device has been disconnected. The user visually checks the target device, and selects a button 576 indicating YES in a case of disconnection of the communication cable, or selects a button 578 indicating NO not in the case of disconnection.

When button 576 is selected in the display screen in state ST32, the display screen changes to a display screen shown in a state ST34.

The display screen shown in state ST34 is displayed when disconnection of the communication cable connected to the target device is identified as an anomaly factor. The anomaly factor estimation process ends in this stage. Specifically, displayed in the display screen shown in state ST34 is a message 580 for giving a notification that the anomaly factor is disconnection of the communication cable of the identified device, and urging replacement of the disconnected communication cable. The display screen shown in state ST34 includes a button 582 for accepting an agreement from the user. The user replaces the disconnected communication cable, performs a reset operation as necessary, and then selects button 582 to end the anomaly factor estimation process.

Note that a screen for supporting replacement of the communication cable, such as a screen showing a position of connection between the target device and the communication cable, a screen showing a route of the communication cable, and a screen showing reset procedures, may be displayed in the display screen shown in state ST34 in accordance with a request from the user, for example. Moreover, the network configuration and the apparatus configuration may be schematically displayed for visual notification of the position of the cable.

As shown in states ST22 to ST34, information processing apparatus 50 sequentially presents to the user a plurality of factor candidates which are similar to each other and associated with the target anomaly phenomenon, and sequentially presents to the user actions for the plurality of factor candidates similar to each other. As shown in states ST26, ST30, and ST34, when the target anomaly phenomenon is recovered by execution of the action presented to the user, information processing apparatus 50 identifies the factor associated with the corresponding actions as the factor having caused the target anomaly phenomenon. This presentation method adopted herein provides more convincing description for the user.

Figure 11:
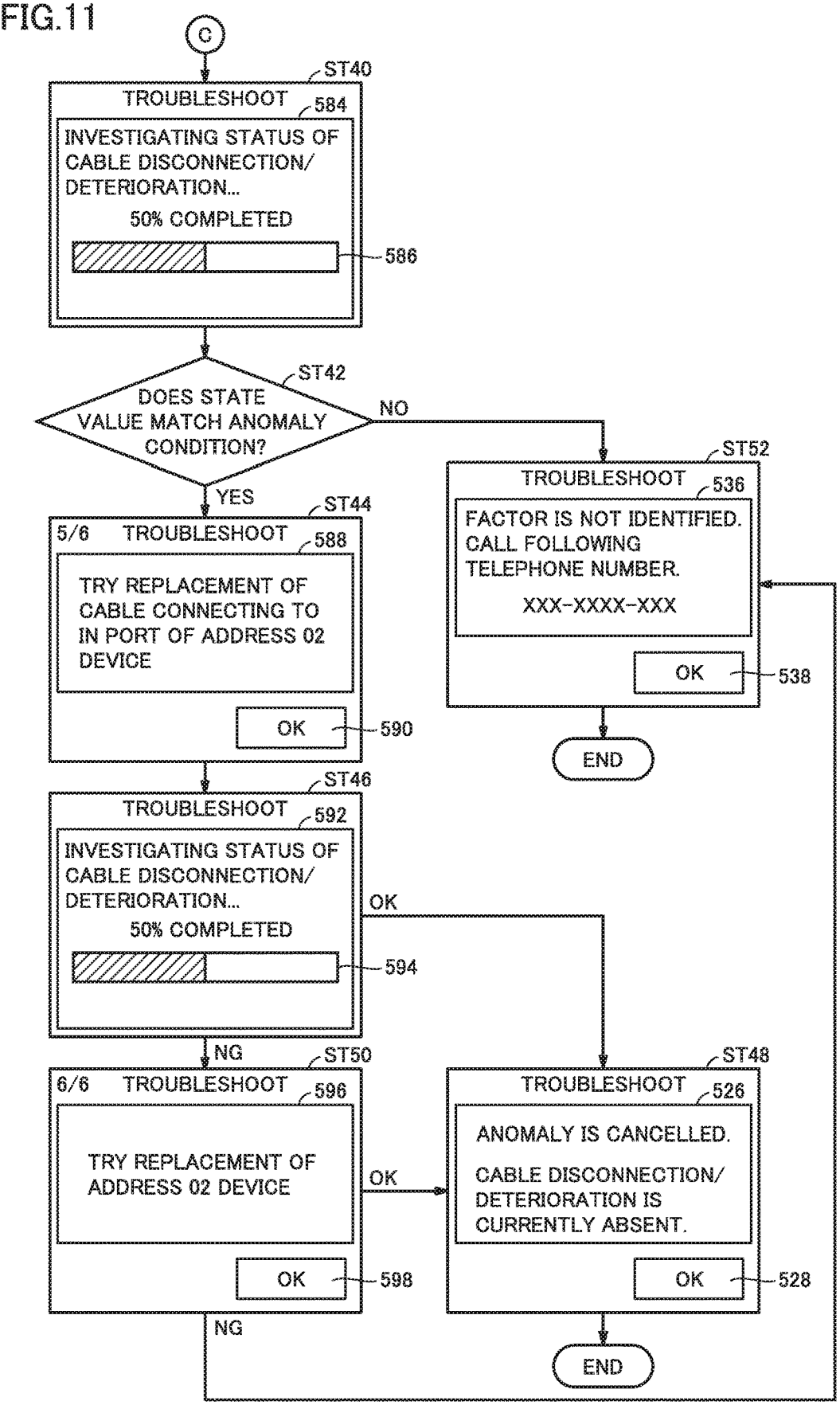
FIG. 11 is a schematic diagram showing an example of the interactive user interface provided in the anomaly factor estimation process according to the present embodiment.

On the other hand, when the user selects button 578 in the display screen in state ST32, i.e., when none of the three presented factors is applicable, the display screen changes to a display screen shown in FIG. 11. Moreover, when communication with the device as the source of the anomaly process data communication has been established via field network 2 (YES in state ST20), the display screen similarly changes to the display screen shown in FIG. 11.

Referring to FIG. 11, a state of communication with the device having caused the anomaly phenomenon is evaluated. At this time, a display screen shown in a state ST40 is presented to the user. A progress bar 586 indicating progress of the process is displayed in a display screen in state ST40 together with a message 584 indicating that disconnection or a deterioration status of the communication cable is under investigation.

Evaluation of this communication state is achieved using a state value (for example, the number of received error frames or the number of frame reception timeouts) in network statistical information 38 or the like. For example, whether a portion causing any anomaly is present on the network line can be investigated based on a comparison between an initial value measured in advance (for example, at the time of installation of a new facility) and a current value. Alternatively, whether a portion causing any anomaly is present on the network line can be investigated based on a determination of whether the measured state value (the number of received error frames or the number of frame reception timeouts) or the like exceeds a predetermined threshold value.

Instead, whether a portion causing any anomaly is present on the network line can be investigated based on contents of packets exchanged with the target device in access log 36.

For this evaluation of the communication state, it is determined whether the state value such as the number of received error frames and the number of frame reception timeouts matches a predetermined anomaly condition (state ST42).

When the state value such as the number of received error frames and the number of frame reception timeouts matches the predetermined anomaly condition (YES in state ST42), the display screen changes to a display screen shown in a state ST44.

The display screen shown in state ST44 indicates that performance exhibited by the communication cable connected to the target device is not equivalent to original performance. A message 588 for urging replacement of the communication cable connected to the target device is displayed in the display screen in state ST44. After replacement of the communication cable connected to the target device, the user selects a button 590 indicating OK.

When button 590 is selected in the display screen in state ST44, the state of communication with the device having caused the anomaly phenomenon is again evaluated. At this time, a display screen shown in a state ST46 is presented to the user. For evaluation of state ST46, it is determined whether a state value such as the number of received error frames and the number of frame reception timeouts matches a predetermined anomaly condition similarly to state ST42. Specifically, information processing apparatus 50 determines whether the target anomaly phenomenon is recovered by an action taken by the user based on network statistical information 38 as necessary.

When the state value such as the number of received error frames and the number of frame reception timeouts does not match the predetermined anomaly condition (OK in state ST46) (i.e., a state of recovery from the anomaly process communication), the display screen changes to a display screen shown in a state ST48.

The display screen shown in state ST48 is displayed when a problem of the communication cable itself connected to the target device is identified as an anomaly factor. The anomaly factor estimation process ends in this stage. Specifically, displayed in the display screen shown in state ST48 is a message 516 for giving a notification that the anomaly phenomenon is recovered by an action such as replacement of the communication cable, and indicating that the anomaly process data communication is currently absent. The display screen shown in state ST48 includes a button 518 for accepting an agreement from the user. The user checks contents of message 516, and selects button 518 indicating OK to end the anomaly factor estimation process.

As shown in states ST46 and ST48, and a state ST50, information processing apparatus 50 evaluates the state of communication with the device associated with the target anomaly phenomenon based on the state value in network statistical information 38 to determine whether the target anomaly phenomenon is recovered. Identification of the factor and reliability of determination as recovery from the anomaly phenomenon can be enhanced by using this method based on evaluation of the communication state.

On the other hand, when the state value such as the number of received error frames and the number of frame reception timeouts matches the predetermined anomaly condition (NG in state ST46) (i.e., a state where the anomaly process communication has not been recovered yet), the display screen changes to a display screen shown in state ST48.

The display screen shown in state ST48 indicates that another action is required in the state without recovery from the anomaly phenomenon even after replacement of the communication cable of the target device. A message 596 for urging replacement of the target device is displayed in the display screen in state ST48. After replacement of the target device, the user selects a button 598 indicating OK.

When button 590 is selected in the display screen of state ST48, it is evaluated whether the anomaly state is continuing even after replacement of the device. When it is determined that the anomaly state is recovered after replacement of the device (OK in state ST48), the display screen changes to the display screen shown in state ST48. The display screen shown in state ST48 has been described above, wherefore the same description will not be repeated.

On the other hand, when the anomaly state continues even after replacement of the device (NG in state ST48), the display screen changes to a display screen shown in a state ST52.

In addition, when the state value such as the number of received error frames and the number of frame reception timeouts does not match the predetermined anomaly condition in state ST42 (NO in state ST42), the display screen similarly changes to the display screen shown in state ST52.

The display screen shown in state ST52 is displayed when it is determined that estimation of the anomaly factor is difficult by using the flow associated with the anomaly factor estimation process and acquired beforehand and information and data acquired by control system 1.

Displayed in the display screen of state ST52 is a message 536 for giving a notification that the anomaly factor has not been identified, and presenting a telephone number of a support department or the like and urging a request for taking an action for the anomaly occurred. The user requests the necessary action, and then selects a button 538 indicating OK to end the anomaly factor estimation process.

Identification of and recovery from the anomaly factor is rapidly achievable by providing the interactive user interface as described above.

Note that the display screen may be shifted to the display screen shown in state ST52 when the user determines that a further action is difficult to take even in the middle of a set of the interactive user interface shown in FIGS. 8 to 11. For example, this shift is allowed when the target unit is difficult to visually check, or when the target unit is difficult to replace.

In addition, when the anomaly phenomenon occurred is recovered as a result of the anomaly factor estimation process based on a set of the interactive user interface shown in FIGS. 8 to 11, details of a basis for the recovery from the anomaly may be presented. For example, a change or a transition of the number of received error frames or the number of frame reception timeouts after the recovery from the anomaly may be presented. A psychological burden on the user can be also reduced by providing more convincing description that the anomaly factor is recovered as described above.

(d3: Anomaly-Factor History Database 226 and Factor Estimation Flow Database 228)

Described next will be an example of anomaly-factor history database 226 and factor estimation flow database 228 for achieving a set of the interactive user interface shown in FIGS. 8 to 11.

Figure 12:
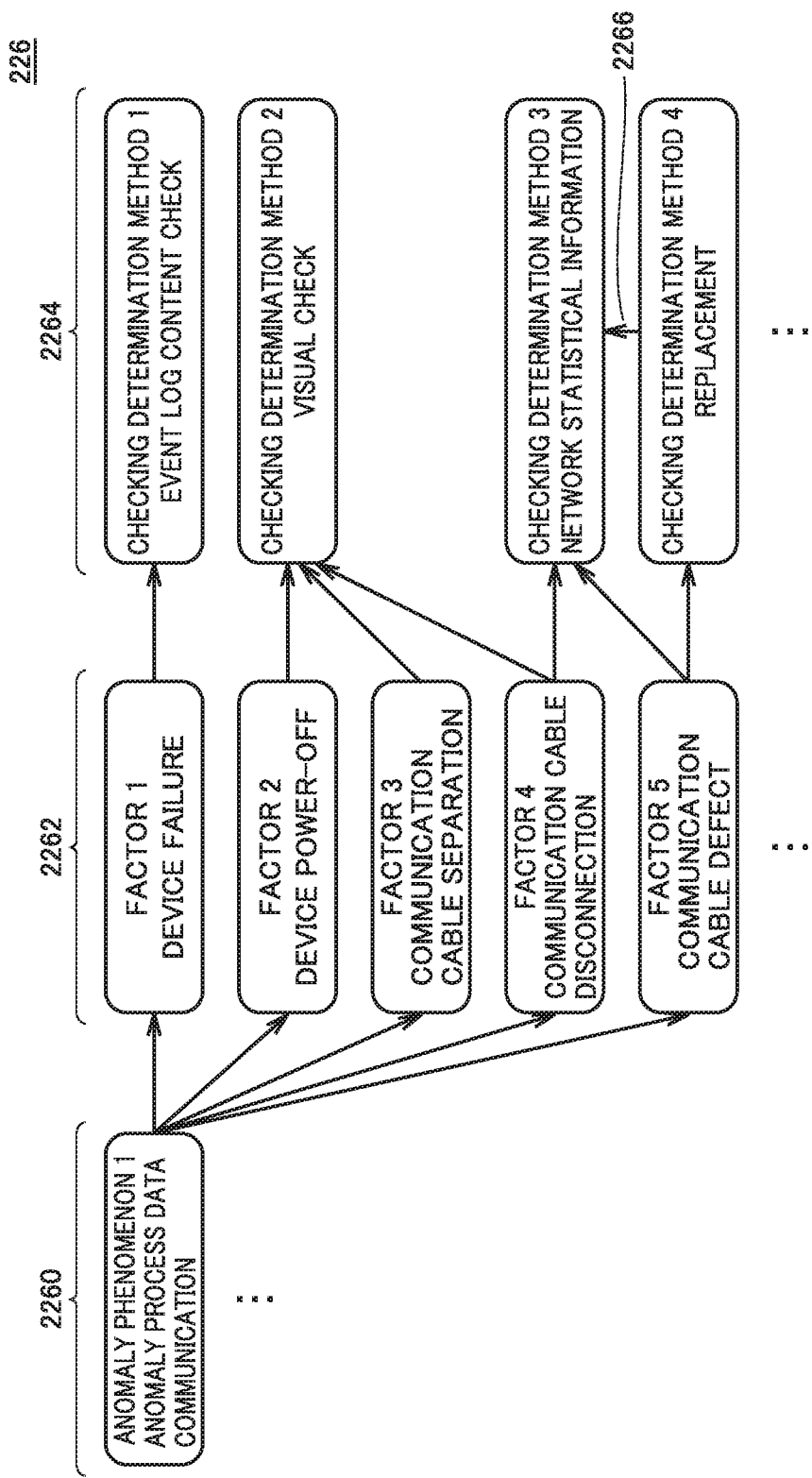
FIG. 12 is a schematic diagram showing an example of an anomaly-factor history database used in the control system according to the present embodiment.

FIG. 12 is a schematic diagram showing an example of anomaly-factor history database 226 used in control system 1 according to the present embodiment. Referring to FIG. 12, one or more anomaly phenomenon items 2260 are arranged as key nodes in anomaly-factor history database 226. Contents of an anomaly phenomenon corresponding to a factor estimation target of the anomaly factor estimation process are defined for each of anomaly phenomenon items 2260. In the example shown in FIG. 12, "anomaly process communication" is indicated as an anomaly factor.

One or more factor items 2262 are associated with each of anomaly phenomenon items 2260. A factor which may cause corresponding anomaly phenomenon item 2260 is defined for each of factor items 2262. Usually, a plurality of factors are assumed for one anomaly phenomenon. Accordingly, a plurality of factor items 2262 are generally associated with one anomaly phenomenon item 2260. In the example shown in FIG. 12, "device failure", "device power cutoff", "communication cable separation", "communication cable disconnection", "unnecessity of communication cable", and others are shown as factors.

One or more checking determination method items 2264 are associated with each of factor items 2262. A method for checking or determining the presence of corresponding factor item 2262 is defined for each of checking determination method items 2264. In the example shown in FIG. 12, "event log contents check", "visual check", "network statistical information", "replacement", and others are shown each as the checking determination method.

Note that a combination of a plurality of checking determination methods may be used to take an action for one factor. For example, a linking 2266 between the plurality of checking determination method items or the like may also be used to cope with this case. By using linking 2266 between the items as described above, the presence or absence of an aimed factor can be determined using the checking determination method carried out according to predetermined procedures.

Note that the factor and the checking determination method associated with one anomaly phenomenon are shown in FIG. 12 by way of example for convenience of description. However, the factor and the checking determination method may be associated not only with the one anomaly phenomenon as described above, but also with a plurality of anomaly phenomena.

The interactive user interface shown in FIGS. 8 to 11 is provided using anomaly-factor history database 226 shown in FIG. 12. Factor estimation flow database 228 defines a display order and the like for providing the interactive user interface.

Figure 13:
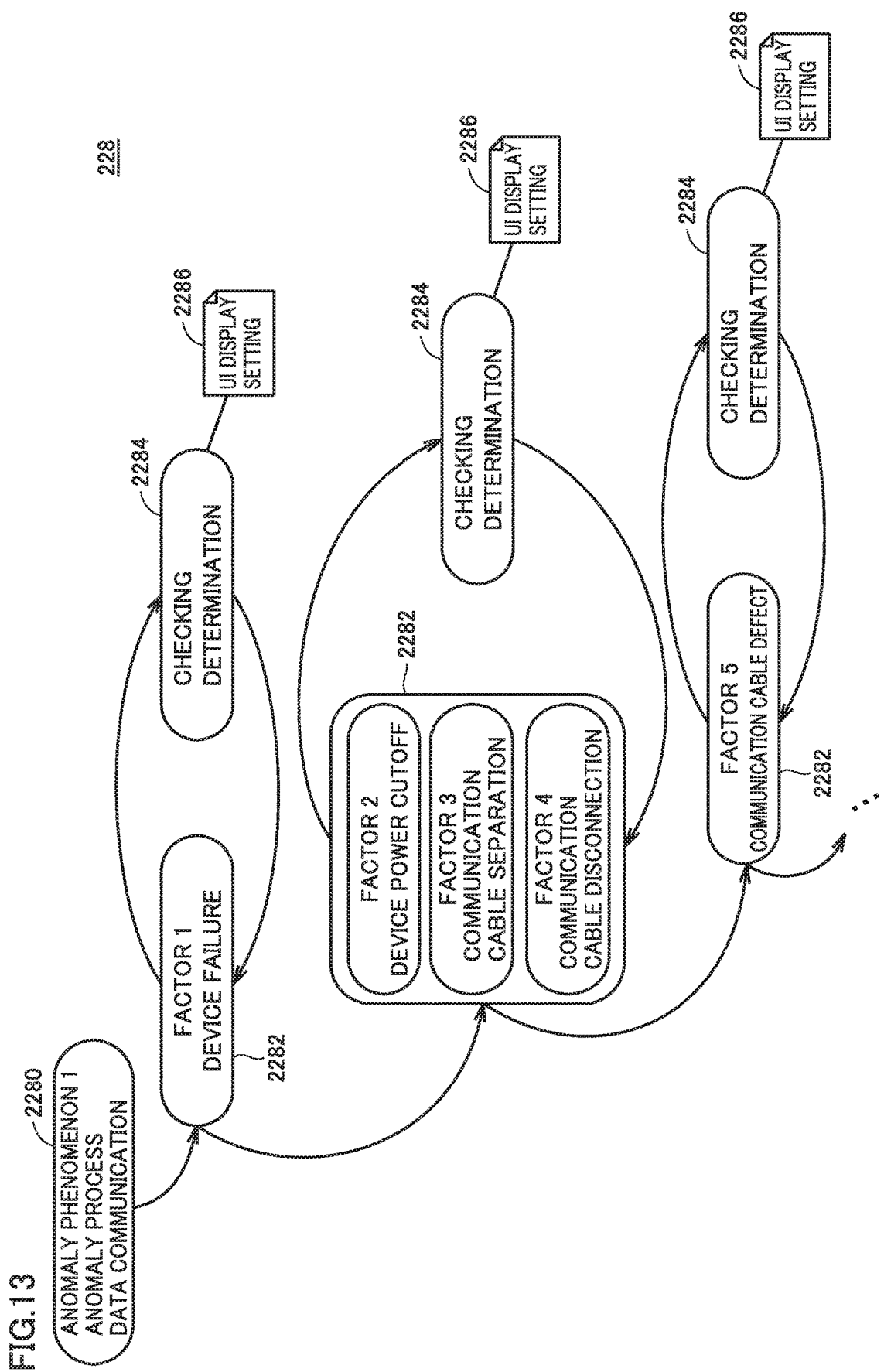
FIG. 13 is a schematic diagram showing an example of a factor estimation flow database used in the control system according to the present embodiment.

FIG. 13 is a schematic diagram showing an example of factor estimation flow database 228 used in control system 1 according to the present embodiment. Referring to FIG. 13, a plurality of states corresponding to respective steps of the flow are defined for factor estimation flow database 228, for example.

More specifically, one or more factor nodes 2282 are associated with factor estimation flow database 228 using any anomaly phenomenon node 2280 as a root node in accordance with an order of contents presented to the user. In other words, a sequential shift from anomaly phenomenon node 2280 as the root node to one or more factor nodes 2282 is defined.

A checking determination node 2284 which defines a checking determination method is associated with each of anomaly phenomenon nodes 2280. A necessary checking process or determination process is executed, or the user is urged to perform a predetermined operation with reference to contents of anomaly-factor history database 226 shown in FIG. 12. A user interface display setting 2286 is associated with checking determination node 2284. Information indicating text and layout within a display screen presented as the interactive user interface shown in FIGS. 8 to 11 is stored.

Note that a plurality of factors corresponding to a common checking determination method may be associated with one factor node 2282.

The display order (flow) or the like of the interactive user interface provided by the anomaly factor estimation process according to the present embodiment can be defined in the manner of the mode shown in FIG. 13. For defining the display order of the factors in the interactive user interface, priority may be given to a factor which becomes a factor of an anomaly phenomenon with high frequency or high probability in the root node with reference to a past failure history or the like.

Note that the data structure of factor estimation flow database 228 shown in FIG. 13 is presented only by way of example. Any data structure may be adopted.

Instead of the data structure shown in FIG. 13, a data structure which integrates anomaly-factor history database 226 and factor estimation flow database 228 may be adopted. In this case, contents of the flow presented to the user for each anomaly phenomenon are defined in advance.

Alternatively, contents of the flow presented to the user for each anomaly phenomenon may be dynamically generated. In this case, factors and checking determination items associated with the anomaly phenomenon occurred are extracted from anomaly-factor history database 226. The extracted factors and checking determination items are associated with previous factor analysis results and the like for each anomaly phenomenon. In this manner, the order of the factors to be presented to the user and the order of the contents to be proposed as an action or the like can be optimized according to situations.

Moreover, contents of anomaly-factor history database 226 may be enriched and optimized by collecting information from one or more controllers 100 or adding information from the outside.

<E. Implementation Example>

Described next will be several examples implemented in control system 1 according to the present embodiment to provide the anomaly factor estimation process.

(e1: Implementation Example 1: Process Mainly Performed by Support Apparatus)

Figure 14:
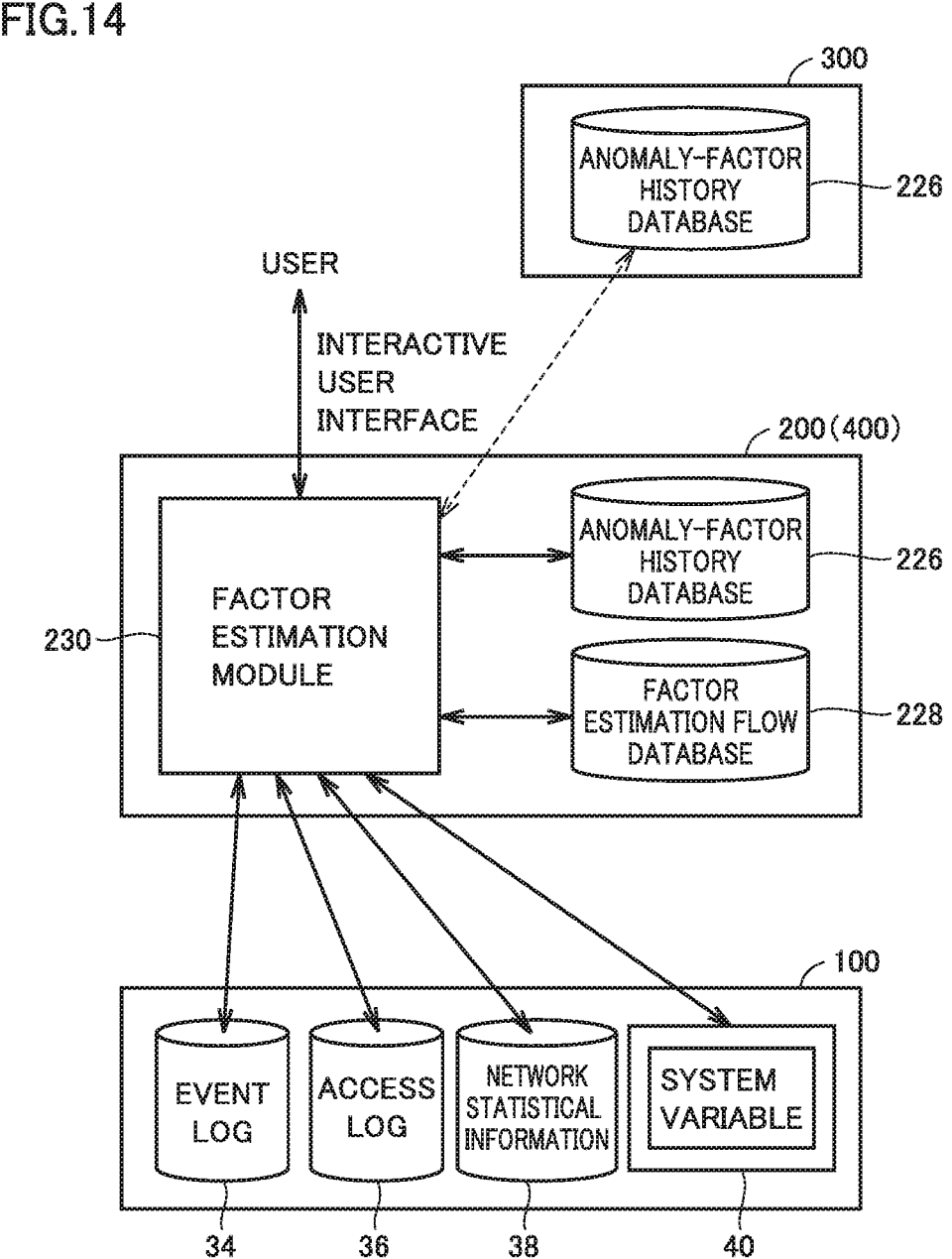
FIG. 14 is a schematic diagram showing an implementation example of the control system according to the present embodiment.

FIG. 14 is a schematic diagram showing an implementation example of control system 1 according to the present embodiment. Referring to FIG. 14, the anomaly factor estimation process according to the present embodiment may be provided by support apparatus 200. In an implementation example where support apparatus 200 provides the anomaly factor estimation process, a factor estimation module 230 for providing the anomaly factor estimation process is implemented in support apparatus 200.

Anomaly-factor history database 226 and factor estimation flow database 228 are arranged in support apparatus 200 in addition to factor estimation module 230. Support apparatus 200 extracts event log 34, access log 36, and network statistical information 38 retained in target controller 100, and provides an interactive user interface for the user with reference to system variables and the like in variable value group 40 of controller 100.

In the present implementation example, the user interface is provided for the user via display unit 218 of support apparatus 200, and an operation is received from the user via input unit 216 of support apparatus 200.

As described above, adoptable is such an implementation example where factor estimation module 230 and a necessary database for providing the anomaly factor estimation process are arranged in support apparatus 200 connected to controller 100.

(e2: Implementation Example 2: Process Mainly Performed by Display Apparatus)

In a manner similar to the implementation example where support apparatus 200 provides the anomaly factor estimation process as shown in FIG. 14 described above, display apparatus 400 may provide the anomaly factor estimation process. In this implementation example, display apparatus 400 may provide an interactive user interface associated with the anomaly factor estimation process as a part of an operation monitoring interface screen. Alternatively, an operation monitoring mode and an anomaly factor estimation mode may be selectively provided.

As described above, adoptable is such an implementation example where factor estimation module 230 and a necessary database for providing the anomaly factor estimation process are arranged in display apparatus 400 connected to controller 100.

(e3: Implementation Example 3: Configuration Where Server Apparatus 300 Retains Anomaly-Factor History Database 226)

According to the configuration of the implementation example shown in FIG. 14, support apparatus 200 or display apparatus 400 retains anomaly-factor history database 226. However, anomaly-factor history database 226 may be arranged in server apparatus 300. In this case, support apparatus 200 or display apparatus 400 refers to anomaly-factor history database 226 stored in server apparatus 300, and transmits a generated anomaly-factor history to server apparatus 300.

As described above, adoptable is such an implementation example where a part of the database necessary for providing the anomaly factor estimation process is arranged in server apparatus 300 accessible from support apparatus 200 or display apparatus 400.

(e4: Implementation Example 4: Provision of Interactive User Interface on Portable Terminal Apparatus 500)

Figure 15:
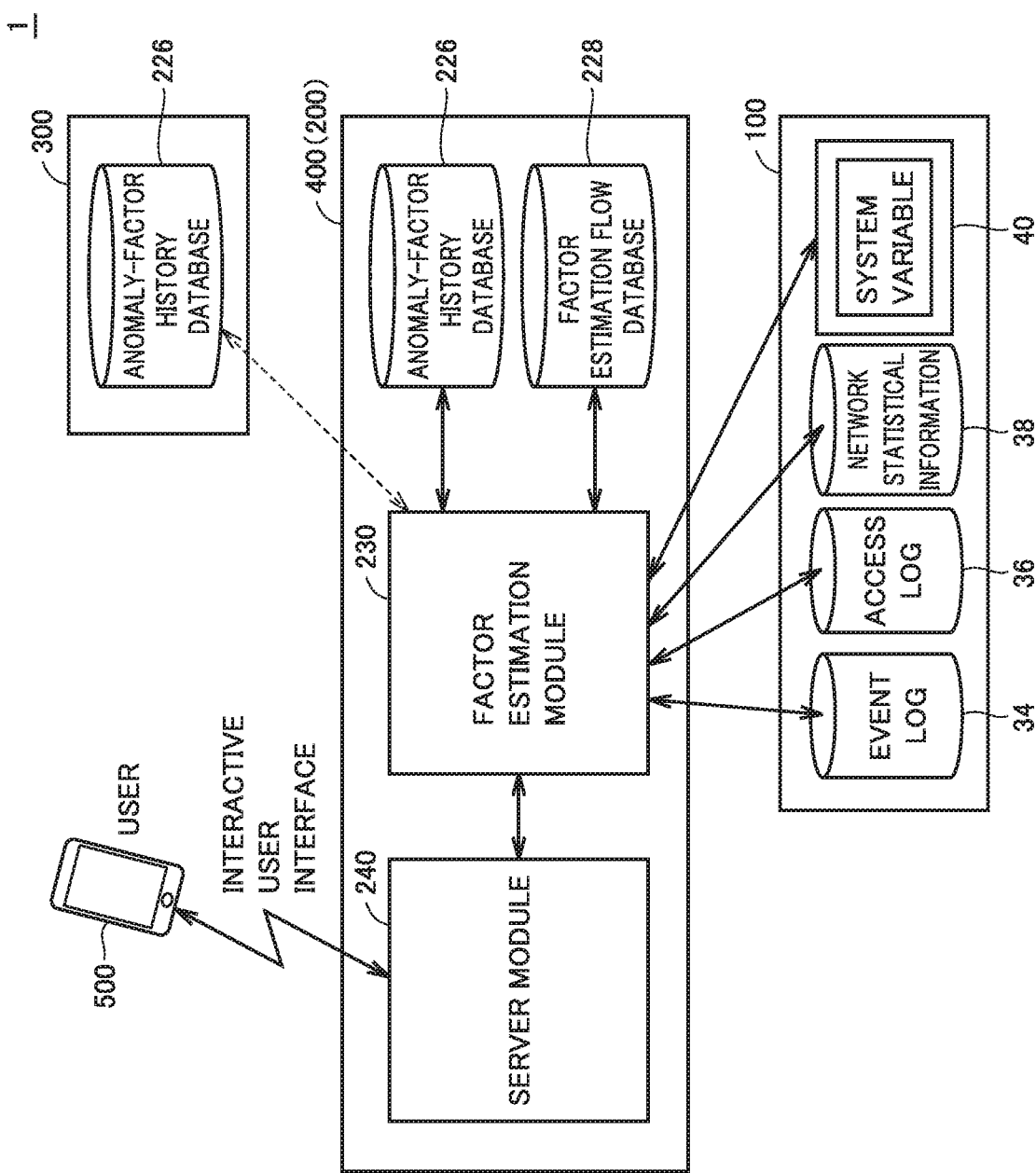
FIG. 15 is a schematic diagram showing another implementation example of the control system according to the present embodiment.

FIG. 15 is a schematic diagram showing another implementation example of control system 1 according to the present embodiment. The configuration shown in FIG. 15 is different from the configuration shown in FIG. 14 in that portable terminal apparatus 500, and a server module 240 for exchanging data with portable terminal apparatus 500 are added.

According to the configuration shown in FIG. 15, display apparatus 400 (or support apparatus 200) has server module 240, and exchanges data for providing an interactive user interface with portable terminal apparatus 500.

For example, server module 240 has a software function for exchanging data with portable terminal apparatus 500 in conformity with HTTP (Hypertext Transfer Protocol) or the like, and a communication function for transmitting and receiving data by wireless communication or the like. Server module 240 generates an HTML (HyperText Markup Language) page including data output from factor estimation module 230, and transmits the generated page to portable terminal apparatus 500, and also receives contents of an operation input from the user by operating portable terminal apparatus 500, and outputs the received contents to factor estimation module 230.

When this configuration is adopted, the user is allowed to perform the interactive anomaly factor estimation process on portable terminal apparatus 500 without the necessity of directly operating an actual production line.

Note that modifications similar to implementation examples 1 to 3 described above are adoptable in the configuration example shown in FIG. 15. For example, anomaly-factor history database 226 necessary for the anomaly factor estimation process may be arranged in server apparatus 300.

Moreover, FIG. 15 shows the configuration example where the interactive user interface is provided for portable terminal apparatus 500 via wireless communication. However, other configurations may be adopted. The interactive user interface may be provided for a wired personal computer or server. Furthermore, for example, the user can estimate a factor having caused any anomaly phenomenon on a remote personal computer, and issue an instruction of a necessary action by connecting to an electronic conferencing system formed on a cloud.

A part of functions or data included in the configuration examples shown in FIGS. 14 and 15 may be arranged in a further different processing entity. In other words, the functions may be distributed by networking or the like.

(e5: Implementation Example 5: Configuration for Managing Multiple Controllers 100)

It is assumed that the anomaly factor estimation process is performed for single controller 100 in implementation examples 1 to 4 described above. However, a plurality of controllers 100 are generally arranged in an actual production line. In this case, the plurality of controllers 100 may each access single server apparatus 300.

Figure 16:
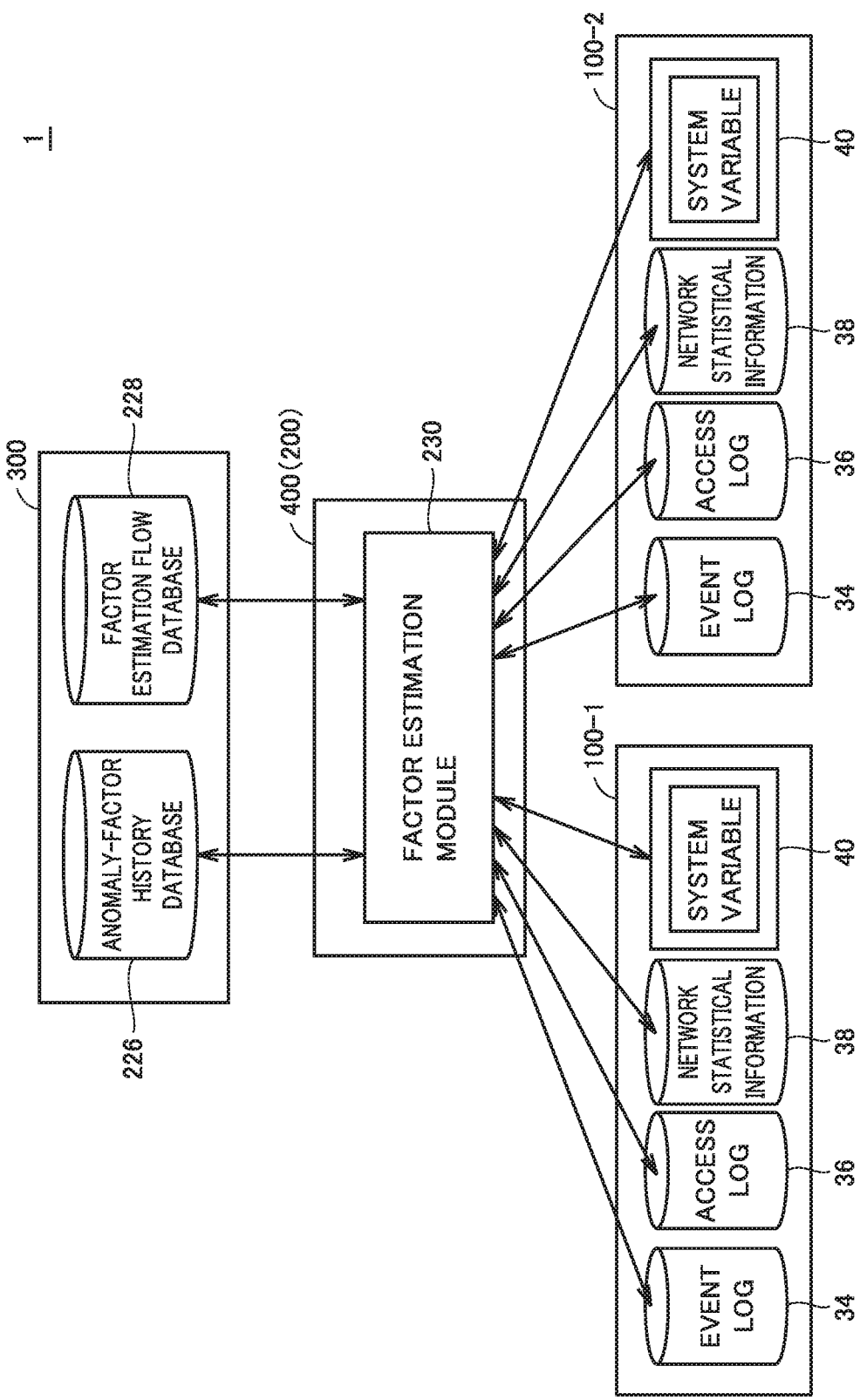
FIG. 16 is a schematic diagram showing a further implementation example of the control system according to the present embodiment.

FIG. 16 is a schematic diagram showing a still further implementation example of control system 1 according to the present embodiment. Control system 1 shown in FIG. 16 includes a plurality of controllers 100-1, 100-2, and others. Display apparatus 400 (or support apparatus 200) is allowed to execute the anomaly factor estimation process for each of the plurality of controllers 100-1, 100-2, and others.

According to this configuration, server apparatus 300 which retains anomaly-factor history database 226 and factor estimation flow database 228 may be arranged, and data from each of the plurality of controllers 100-1, 100-2, and others may be stored in anomaly-factor history database 226 and factor estimation flow database 228 of server apparatus 300.

Display apparatus 400 (or support apparatus 200) may be configured to access necessary data in anomaly-factor history database 226 and factor estimation flow database 228 stored in server apparatus 300 in accordance with target controller 100.

As shown in FIG. 16, the configuration for achieving the anomaly factor estimation process can be simplified by arranging necessary functions and data in an upper apparatus which integrates a plurality of controllers 100. Moreover, an anomaly factor occurring in the plurality of controllers 100 can be estimated by identifying the anomaly factor occurring in the plurality of controllers 100.

Note that modified examples similar to implementation examples 1 to 4 described above are adoptable in the configuration example shown in FIG. 16. For example, server module 240 may be further arranged to provide an interactive user interface on portable terminal apparatus 500.

(e6: Implementation Example 6: Configuration for Storing Necessary Data in Controller 100)

While the configuration which achieves the factor estimation process by linking a plurality of processing entities is presented by way of example in implementation examples 1 to 5 described above. However, necessary data may be stored in controller 100.

Figure 17:
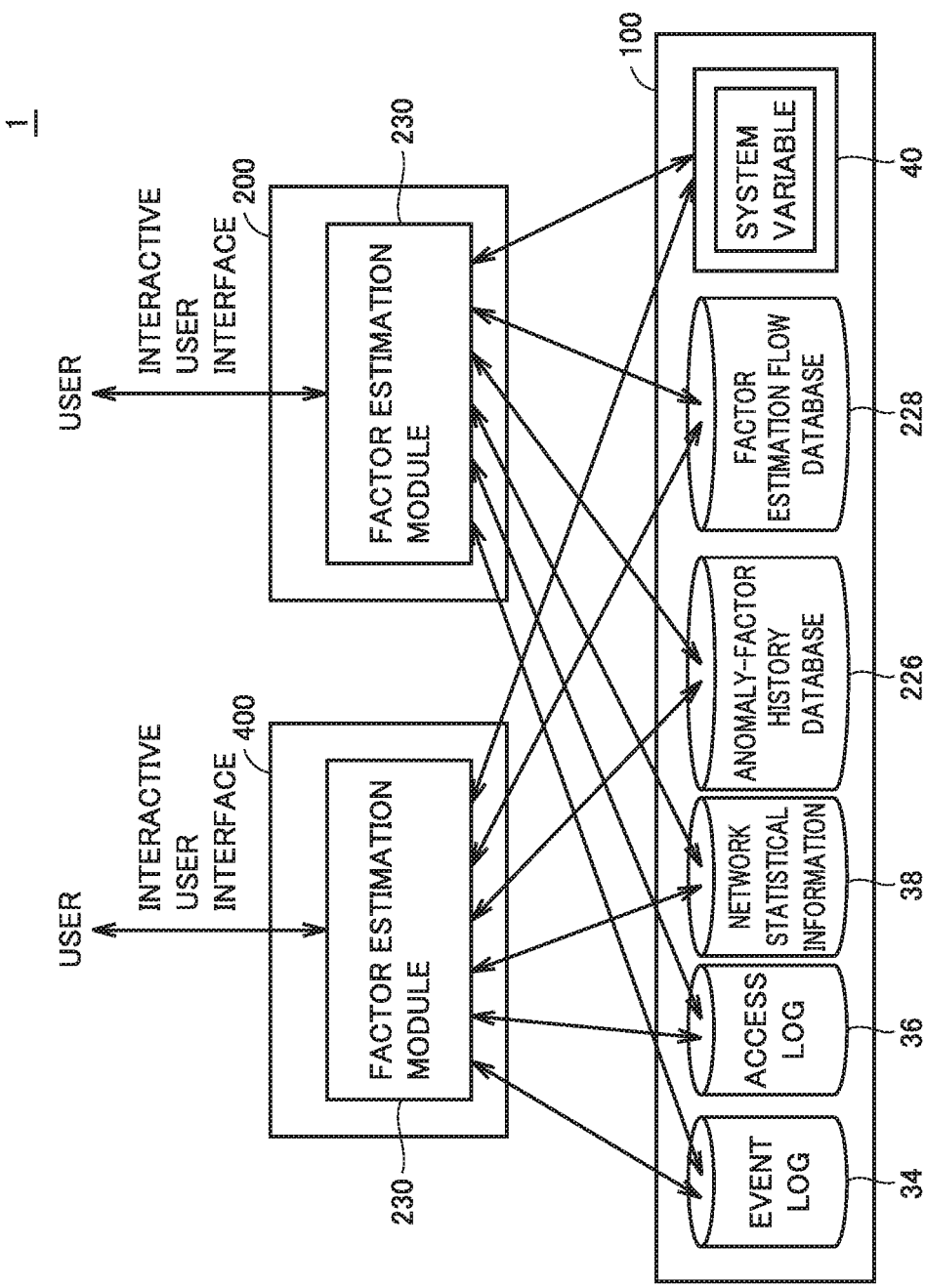
FIG. 17 is a schematic diagram showing a still further implementation example of the control system according to the present embodiment.

FIG. 17 is a schematic diagram showing a still further implementation example of control system 1 according to the present embodiment. Controller 100 in control system 1 shown in FIG. 17 retains anomaly-factor history database 226 and factor estimation flow database 228 themselves in addition to event log 34, access log 36, and network statistical information 38.

Support apparatus 200 or display apparatus 400 connected to controller 100 has factor estimation module 230. Factor estimation module 230 collects necessary data from controller 100 to achieve the anomaly factor estimation process according to the present embodiment. In this manner, support apparatus 200 and/or display apparatus 400 provide an interactive user interface by the function provided by factor estimation module 230.

Note that anomaly-factor history database 226 and factor estimation flow database 228 retained in controller 100 may be uploaded from controller 100 to support apparatus 200 or display apparatus 400 in advance rather than referred to by support apparatus 200 or display apparatus 400 for each time. In this case, support apparatus 200 or display apparatus 400 may refer to anomaly-factor history database 226 and factor estimation flow database 228 temporarily stored in support apparatus 200 or display apparatus 400.

In addition, factor estimation module 230 arranged in support apparatus 200 or display apparatus 400 may be distributed in a form of an add-on available library or a function module. In this case, adoptable is such a mode which adds the anomaly factor estimation process to an existing user interface pre-installed in support apparatus 200 or display apparatus 400 while using this user interface function. In other words, a functional module necessary for achieving the interactive anomaly factor estimation process can be provided independently of a functional module providing a user interface. Distribution in the form of this independent function module facilitates the use of the anomaly factor estimation process according to the present embodiment in various modes.

For example, the anomaly factor estimation function may be directly incorporated in an application executed on portable terminal apparatus 500 to provide an interactive user interface for the user by distribution in the add-on available form in this manner even in the absence of support apparatus 200 or display apparatus 400.

<F. Modifications>

Following modifications may be made to the anomaly factor estimation process according to the present embodiment as described above.

(f1: Flow by Skill Level)

Contents of the flow presented in the interactive user interface of the anomaly factor estimation process according to the embodiment described above may vary in accordance with the skill level of the user.

For example, contents (items) allowed to be checked and handled by a site operator who mainly performs a driving operation of a manufacturing apparatus are different from those contents (items) by a maintenance person who is in charge of facility maintenance. In addition, contents (items) allowed to be checked and handled by a senior maintenance person who has more specialized knowledge about controller 100 or the like among the maintenance persons are different from those contents (items) by a beginner maintenance person who has only a little experience in maintenance work.

Accordingly, it is preferable that contents of the flow presented by the interactive user interface vary in accordance with the skill level of checking and handling of an anomaly occurred in control system 1.

Figure 18:
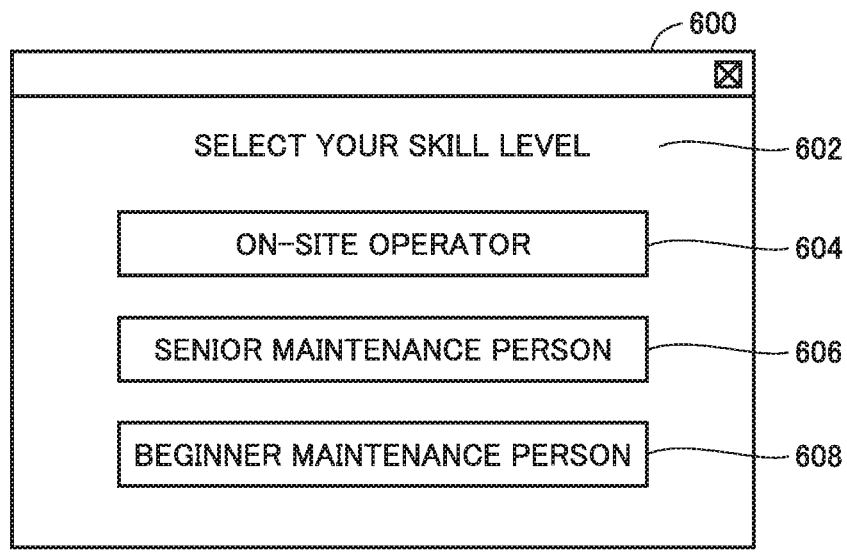
FIG. 18 is a schematic diagram showing an example of a user interface provided in a modification of the control system according to the present embodiment.

FIG. 18 is a schematic diagram showing an example of a user interface provided in a modification of control system 1 according to the present embodiment. Referring to FIG. 18, a dialog 600 shown in FIG. 18 is displayed when the anomaly factor estimation process is started. Dialog 600 includes a message 602 for urging the user to select a skill level, and also selection buttons 604, 606, and 608 for receiving selections of respective skill levels. The user in charge selects his or her skill level by selecting any button on dialog 600.

Figure 19:
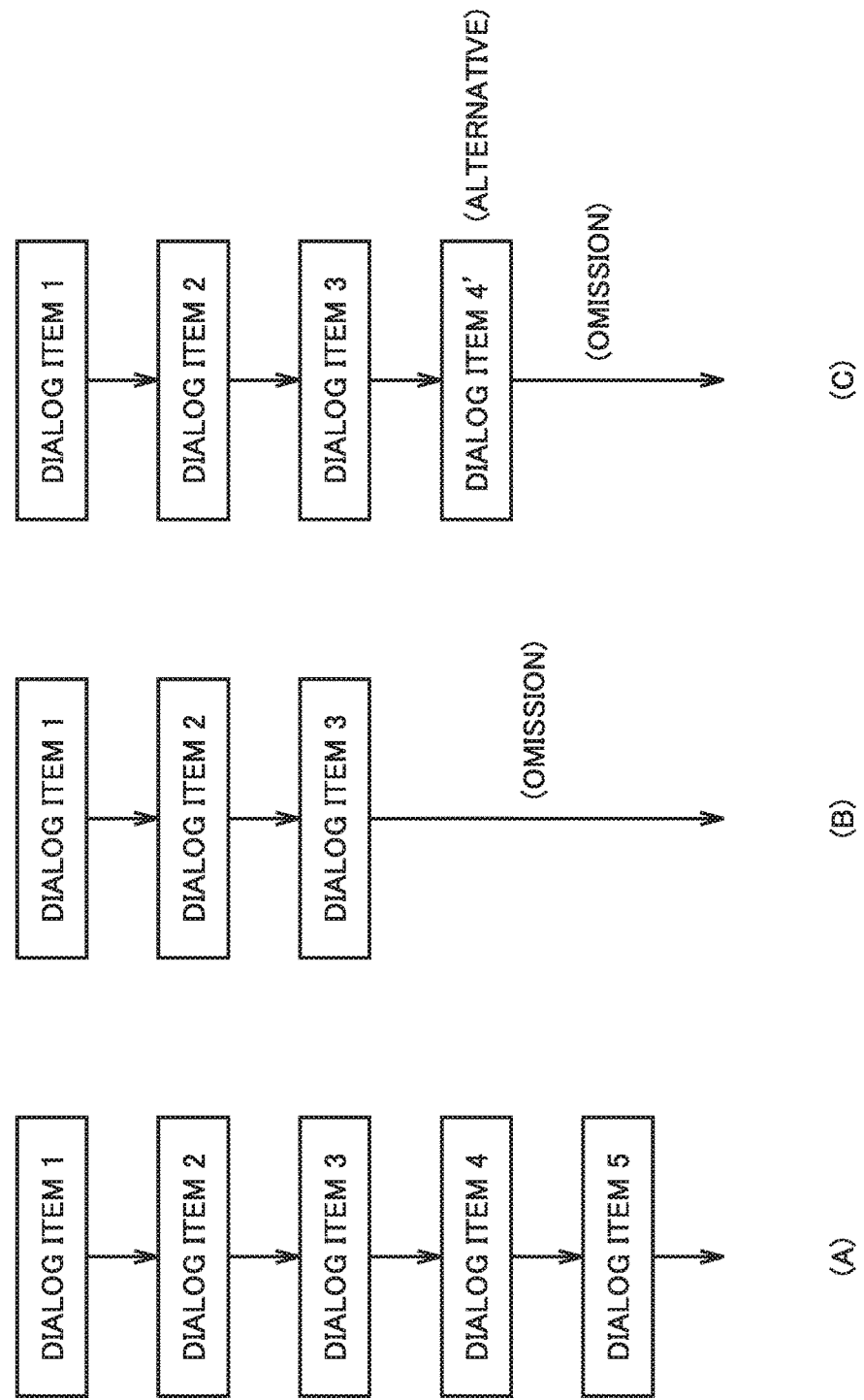
FIG. 19 is a diagram for describing an anomaly factor estimation process in a modification of the control system according to the present embodiment.

FIG. 19 is a diagram for describing an anomaly factor estimation process in a modification of control system 1 according to the present embodiment. FIGS. 19(A) to 19(C) each show an example of the anomaly factor estimation process for each skill level of the user.

FIG. 19(A) shows an example of a flow provided for a senior maintenance person. For example, dialog items 1 to 5 are sequentially provided as necessary. FIGS. 19(B) and 19(C) each show an example of a flow provided for a skill level (on-site operator or beginner maintenance person) other than the senior maintenance person. In the flow shown in FIG. 19(B), two dialog items (specifically, dialog items 4 and 5) included in the flow of FIG. 19(A) are omitted. Accordingly, the two dialogue items are not presented in consideration of the skill level of the user. In addition, as shown in FIG. 19(C), a specific dialog item is changed to another dialog item. Specifically, an alternative dialog item is presented instead of the dialog item for the senior maintenance person in consideration of the skill level of the user. This alternatively presented dialogue item is directed to another way for checking the presence of a factor of any target. In addition, as shown in FIG. 19(C), omission of a part of the dialog items may be made in addition to presentation of the alternative dialog item.

In the present modification, information processing apparatus 50 accepts selection of the skill level of the user, and varies contents of the interactive user interface in accordance with the selected skill level as shown in FIG. 18. In other words, the presented flow is varied in accordance with the skill level of the user performing the anomaly factor estimation process. In addition, the user can use any flow (i.e., select any skill level) by himself or herself. According to the present modification, a more prompt action is achievable by providing an appropriate proposal in accordance with the skill level (ability) of the user performing the anomaly factor estimation process.

For example, in a case of an anomaly factor allowed to be identified within a range of the skill level of the user in charge, a flow capable of rapidly identifying the anomaly factor may be provided. In a case of an anomaly factor exceeding the skill level of the user in charge, early takeover to an optimal person (for example, senior maintenance person) may be promoted. This configuration allows proposal of a comprehensively efficient action without continuing work more than necessary at the time of occurrence of an anomaly factor difficult to handle by the user in charge.

(f2: Reference to Operation Information and History Information)

An anomaly factor may be identified with reference to operation information and/or history information associated with respective units or respective devices in addition to the information described above. More specifically, the anomaly factor may be estimated with reference to the degree of increase in a failure rate based on an operation time of respective units or respective devices. In other words, a unit or a device whose failure probability increases may be identified in a plurality of units and/or devices each estimated as an anomaly factor.

FIG. 20 is a schematic diagram showing an example of an operation information database 44 in a modification of control system 1 according to the present embodiment. Operation information database 44 is typically retained and updated by controller 100.

Referring to FIG. 20, operation information database 44 includes a network address field 441, a device type field 442, a device model number field 443, an attachment date field 444, a total operation time field 445, an operation time field 446, and an anomaly history field 447.

Network address field 441 contains information for identifying connection positions of network addresses and the like of respective devices. Device type field 442 contains types of respective devices. Device model number field 443 contains model numbers (or product numbers or serial numbers) of respective devices. Attachment date field 444 contains information indicating a date when respective units (or devices) are attached to control system 1, for example. Total operation time field 445 contains a total operation time from attachment of respective devices to the present time. Operation time field 446 contains an operation time from a start of operations of respective devices in accordance with activation of controller 100. Anomaly history field 447 contains contents of an event occurred in respective devices together with a time of occurrence.

For example, assuming that candidates each likely to cause an anomaly factor are temperature controllers (network addresses 00 and 01) and a coupler unit (network address 02) in operation information database 44 shown in FIG. 20, the temperature controller having a longer total operation time may be determined to be an anomaly factor with high probability. Alternatively, the coupler unit having an anomaly history may be determined to be the anomaly factor with high probability.

In this manner, accuracy of anomaly factor estimation can be raised by referring to operation information database 44. For example, respective devices more likely to fail may be estimated as an anomaly factor based on the attachment date (replacement history) and the total operation time up to the present time of the respective devices, for example.

<G. Appendix>

The present embodiment described above includes following technical ideas.

[Configuration 1] A control system (1) that controls a control target, including:
- a controller (100) connected to one or more devices through a network; and
- an information processing apparatus (50, 200, 400) connected to the controller, wherein:
- the controller maintains
  - an event log (34) containing an event occurred during a control operation, and
  - network statistical information (38) containing statistical information associated with data transmission on the network;
- the information processing apparatus includes a factor estimation unit (60, 230) that provides an interactive user interface in accordance with selection of an anomaly phenomenon registered in the event log; and
- the factor estimation unit includes
  - means for accessing (62) the event log and the network statistical information in the controller,
  - means for presenting (68) to a user, based on association between an anomaly phenomenon and one or more factors that cause the anomaly phenomenon, an action for identifying a factor having caused a target anomaly phenomenon from among one or more factor candidates associated with the target anomaly phenomenon,
  - means for identifying (64), based on contents of the anomaly phenomenon registered in the event log, the factor having caused the target anomaly phenomenon from among the one or more factor candidates associated with the target anomaly phenomenon, and
  - means for determining (66), based on the network statistical information, whether the target anomaly phenomenon is recovered by an action taken by the user.

[Configuration 2] The control system according to configuration 1, wherein the factor estimation unit presents to the user, based on the contents of the anomaly phenomenon registered in the event log, the identified factor before presenting to the user the action for identifying the factor having caused the target anomaly phenomenon, when the factor having caused the target anomaly phenomenon is identifiable (ST12, ST14).

[Configuration 3] The control system according to configuration 1 or 2, wherein the factor estimation unit presents to the user a plurality of factor candidates that are similar to each other and associated with the target anomaly phenomenon, and sequentially presents to the user actions for the plurality of the factor candidates similar to each other (ST22, ST24, ST28, ST32).

[Configuration 4] The control system according to any one of configurations 1 to 3, wherein, when the target anomaly phenomenon is recovered by execution of the action presented to the user, the factor estimation unit identifies a factor associated with the action as the factor having caused the target anomaly phenomenon (ST26, ST30, ST34).

[Configuration 5] The control system according to any one of configurations 1 to 4, wherein the factor estimation unit evaluates, based on a state value in the network statistical information to determine whether the target anomaly phenomenon is recovered, a state of communication with a device associated with the target anomaly phenomenon (ST46, ST48).

[Configuration 6] The control system according to any one of configurations 1 to 5, wherein:
- the factor estimation unit further includes means for receiving (600) selection of a skill level of the user; and
- the factor estimation unit varies contents of the interactive user interface in accordance with the selected skill level.

[Configuration 7] The control system according to any one of configurations 1 to 6, wherein the information processing apparatus displays a list of one or more events registered in the event log, and starts provision of the interactive user interface corresponding to selection of the event displayed in the list (ST8, ST10).

[Configuration 8] An information processing apparatus (50, 200, 400) connected to a controller (100) that controls a control target, wherein:
- the controller is connected to one or more devices through a network, and includes an event log (34) containing an event occurred during a control operation, and network statistical information (38) containing statistical information associated with data transmission on the network;
- the information processing apparatus includes a factor estimation unit (60, 230) that provides an interactive user interface in accordance with selection of an anomaly phenomenon registered in the event log;
- the factor estimation unit includes
  - means for accessing (62) the event log and the network statistical information in the controller,
  - means for presenting (68) to a user, based on association between an anomaly phenomenon and one or more factors that cause the anomaly phenomenon, an action for identifying a factor having caused a target anomaly phenomenon from among one or more factor candidates associated with the target anomaly phenomenon,
  - means for identifying (64), based on contents of the anomaly phenomenon registered in the event log, the factor having caused the target anomaly phenomenon from among the one or more factor candidates associated with the target anomaly phenomenon, and
  - means for determining (66), based on the network statistical information, whether the target anomaly phenomenon is recovered by an action taken by the user.

[Configuration 9] An anomaly factor estimation program (224) executed by an information processing apparatus (50, 200, 400) connected to a controller (100) that controls a control target, wherein:
- the controller is connected to one or more devices through a network, and maintains an event log (34) containing an event occurred during a control operation, and network statistical information (38) containing statistical information associated with data transmission on the network;

the anomaly factor estimation program causes the information processing apparatus to execute a factor estimation process that provides an interactive user interface in accordance with selection of an anomaly phenomenon registered in the event log;

the factor estimation process includes
accessing the event log and the network statistical information in the controller (62),
presenting to a user (68), based on association between an anomaly phenomenon and one or more factors that cause the anomaly phenomenon (68), an action for identifying a factor having caused a target anomaly phenomenon from among one or more factor candidates associated with the target anomaly phenomenon,
identifying (64), based on contents of the anomaly phenomenon registered in the event log, the factor having caused the target anomaly phenomenon from among the one or more factor candidates associated with the target anomaly phenomenon, and
determining (66), based on the network statistical information, whether the target anomaly phenomenon is recovered by an action taken by the user.

<H. Advantages>

According to control system 1 of the present embodiment, it is easily identified which factor has caused an anomaly phenomenon which may occur in a network to which one or more devices are connected, in candidates of the factor having caused the anomaly phenomenon.

Moreover, even when a plurality of pieces of information which are independent of each other are stored in controller 100 in control system 1 of the present embodiment, these pieces of information are integrated to provide an interactive user interface for the user. Accordingly, even a user not having much knowledge can identify a factor of an anomaly phenomenon.

It should be understood that the embodiment disclosed herein is presented only by way of example, and not considered as restrictive in all aspects. It is intended that the scope of the present invention is defined not by the above description but by the appended claims, and therefore includes all changes made within meanings and ranges equivalent to the scope of the appended claims.

REFERENCE SIGNS LIST

1: control system, 2: field network, 6: upper network, 10: device, 12: remote I/O apparatus, 14: relay group, 16, 124: I/O unit, 18: image sensor, 20: camera, 22: servo driver, 24: servo motor, 30: user program, 32: control engine, 34: event log, 36: access log, 38: network statistical information, 40: variable value group, 44: operation information database, 50: information processing apparatus, 60, 230: factor estimation module, 62: data acquisition module, 64: factor identification module, 66: communication state evaluation module, 68: flow control module, 69: factor candidate, 70: interface module, 100: controller, 102, 202: processor, 104: chip set, 106, 206: main memory, 108, 208: storage, 110: upper network controller, 112, 212: USB controller, 114: memory card interface, 116: memory card, 120: internal bus controller, 130: field network controller, 200: support apparatus, 204: optical drive, 205: recoding medium, 214: network controller, 216: input unit, 218: display unit, 220: bus, 222: support program, 224: anomaly factor estimation program, 226: factor history database, 228: factor estimation flow database, 240: server module, 300: server apparatus, 340, 361: time field, 341: source field, 342, 366: content field, 343: event code field, 360: serial number field, 362: address field, 363: type field, 364: protocol field, 365: port field, 400: display apparatus, 441: network address field, 442: device type field, 443: device model number field, 444: attachment date field, 445: total operation time field, 446: operation time field, 447: anomaly history field, 500: portable terminal apparatus, 502: operation monitoring object, 504: home button, 506, 516, 536, 540, 550, 554, 560, 564, 570, 574, 580, 584, 588, 596, 602: message, 510, 512, 514, 518, 530, 532, 538, 542, 552, 556, 558, 562, 566, 568, 572, 576, 578, 582, 590, 598: button, 520, 522, 524: tab, 526: display area, 528: anomaly message, 586: progress bar, 600: dialog, 604, 606, 608: selection button, 2260: anomaly phenomenon item, 2262: factor item, 2264: checking determination method item, 2266: linking, 2280: anomaly phenomenon node, 2282: factor node, 2284: checking determination node, 2286: user interface display setting

The invention claimed is:

1. A control system that controls a control target, comprising:
a controller connected to one or more devices through a network; and
an information processing apparatus connected to the controller, wherein:
the controller maintains an event log containing an event which occurred during a control operation, and network statistical information containing statistical information associated with data transmission on the network;
the information processing apparatus performs a factor estimation process that provides an interactive user interface in accordance with selection of an anomaly phenomenon registered in the event log; and
the factor estimation process comprises:
accessing the event log and the network statistical information in the controller;
identifying, based on contents of the anomaly phenomenon registered in the event log, a factor having caused the target anomaly phenomenon from among one or more factor candidates associated with the target anomaly phenomenon;
in response to the factor having caused the target anomaly phenomenon not being identifiable based on the contents of the anomaly phenomenon registered in the event log, presenting to a user, based on an association between the anomaly phenomenon and one or more factors that cause the anomaly phenomenon, an action for identifying the factor having caused the target anomaly phenomenon from among the one or more factor candidates associated with the target anomaly phenomenon;
in response to the factor having caused the target anomaly phenomenon being identifiable based on the contents of the anomaly phenomenon registered in the event log, presenting to the user the identified factor; and
after execution of the action presented to the user, determining, based on the network statistical information, whether the target anomaly phenomenon is recovered by an action taken by the user, wherein
the factor estimation process further comprises presenting to the user a plurality of factor candidates that are similar to each other and associated with the target anomaly phenomenon, and sequentially presenting to the user actions for the plurality of the factor candidates.

2. The control system according to claim 1, wherein the factor estimation process further comprises, when the target anomaly phenomenon is recovered by execution of the action presented to the user, identifying a factor associated with the action as the factor having caused the target anomaly phenomenon.

3. The control system according to claim 1, wherein the factor estimation process further comprises evaluating, based on a state value in the network statistical information, a state of communication with a device associated with the target anomaly phenomenon to determine whether the target anomaly phenomenon is recovered.

4. The control system according to claim 1, wherein the factor estimation process further comprises
receiving selection of a skill level of the user, and
varying contents of the interactive user interface in accordance with the selected skill level.

5. The control system according to claim 1, wherein the information processing apparatus displays a list of one or more events registered in the event log, and starts provision of the interactive user interface corresponding to selection of the event displayed in the list.

6. An information processing apparatus connected to a controller that controls a control target, wherein:
the controller is connected to one or more devices through a network, and maintains an event log containing an event which occurred during a control operation and network statistical information containing statistical information associated with data transmission on the network;
the information processing apparatus performs a factor estimation process that provides an interactive user interface in accordance with selection of an anomaly phenomenon registered in the event log; and
the factor estimation process comprises:
accessing the event log and the network statistical information in the controller;
identifying, based on contents of the anomaly phenomenon registered in the event log, a factor having caused the target anomaly phenomenon from among one or more factor candidates associated with the target anomaly phenomenon;
in response to the factor having caused the target anomaly phenomenon not being identifiable based on the contents of the anomaly phenomenon registered in the event log, presenting to a user, based on an association between the anomaly phenomenon and one or more factors that cause the anomaly phenomenon, an action for identifying the factor having caused the target anomaly phenomenon from among the one or more factor candidates associated with the target anomaly phenomenon;
in response to the factor having caused the target anomaly phenomenon being identifiable based on the contents of the anomaly phenomenon registered in the event log, presenting to the user the identified factor; and
after execution of the action presented to the user, determining, based on the network statistical information, whether the target anomaly phenomenon is recovered by an action taken by the user, wherein
the factor estimation process further comprises presenting to the user a plurality of factor candidates that are similar to each other and associated with the target anomaly phenomenon, and sequentially presenting to the user actions for the plurality of the factor candidates.

7. An anomaly factor estimation program executed by an information processing apparatus connected to a controller that controls a control target, wherein:
the controller is connected to one or more devices through a network, and maintains an event log containing an event which occurred during a control operation and network statistical information containing statistical information associated with data transmission on the network;
the anomaly factor estimation program causes the information processing apparatus to perform a factor estimation process that provides an interactive user interface in accordance with selection of an anomaly phenomenon registered in the event log;
the factor estimation process comprises:
accessing the event log and the network statistical information in the controller;
identifying, based on contents of the anomaly phenomenon registered in the event log, a factor having caused the target anomaly phenomenon from among one or more factor candidates associated with the target anomaly phenomenon;
in response to the factor having caused the target anomaly phenomenon not being identifiable based on the contents of the anomaly phenomenon registered in the event log, presenting to a user, based on an association between the anomaly phenomenon and one or more factors that cause the anomaly phenomenon, an action for identifying the factor having caused the target anomaly phenomenon from among the one or more factor candidates associated with the target anomaly phenomenon;
in response to the factor having caused the target anomaly phenomenon being identifiable based on the contents of the anomaly phenomenon registered in the event log, presenting to the user the identified factor; and
after execution of the action presented to the user, determining, based on the network statistical information, whether the target anomaly phenomenon is recovered by an action taken by the user, wherein
the factor estimation process further comprises presenting to the user a plurality of factor candidates that are similar to each other and associated with the target anomaly phenomenon, and sequentially presenting to the user actions for the plurality of the factor candidates.

8. The information processing apparatus according to claim 6, wherein the factor estimation process further comprises, when the target anomaly phenomenon is recovered by execution of the action presented to the user, identifying a factor associated with the action as the factor having caused the target anomaly phenomenon.

9. The information processing apparatus according to claim 6, wherein the factor estimation process further comprises evaluating, based on a state value in the network statistical information, a state of communication with a device associated with the target anomaly phenomenon to determine whether the target anomaly phenomenon is recovered.

10. The information processing apparatus according to claim 6, wherein the factor estimation process further comprises
receiving selection of a skill level of the user, and
varying contents of the interactive user interface in accordance with the selected skill level.

11. The information processing apparatus according to claim 6, wherein the information processing apparatus displays a list of one or more events registered in the event log, and starts provision of the interactive user interface corresponding to selection of the event displayed in the list.

12. The anomaly factor estimation program according to claim 7, wherein the factor estimation process further comprises, when the target anomaly phenomenon is recovered by execution of the action presented to the user, identifying a factor associated with the action as the factor having caused the target anomaly phenomenon.

13. The anomaly factor estimation program according to claim 7, wherein the factor estimation process further comprises evaluating, based on a state value in the network statistical information, a state of communication with a device associated with the target anomaly phenomenon to determine whether the target anomaly phenomenon is recovered.

14. The anomaly factor estimation program according to claim 7, wherein the factor estimation process further comprises
   receiving selection of a skill level of the user, and
   varying contents of the interactive user interface in accordance with the selected skill level.

\* \* \* \* \*